United States Patent
Wei et al.

(10) Patent No.: US 9,436,266 B2
(45) Date of Patent: Sep. 6, 2016

(54) METHOD AND APPARATUS FOR CONTROLLING CENTRAL PROCESSING UNIT IN A GROUP OF CENTRAL PROCESSING UNITS BY ACQUIRING POWER CONSUMPTION FACTORS FOR EACH CENTRAL PROCESSING UNIT AND COMPARING A MEAN OF POWER CONSUMPTION FACTORS WITH A THRESHOLD

(71) Applicant: Huawei Device Co., Ltd., Shenzhen (CN)

(72) Inventors: Konggang Wei, Shenzhen (CN); Hua Zhang, Shenzhen (CN); Yu Peng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 316 days.

(21) Appl. No.: 14/086,711

(22) Filed: Nov. 21, 2013

(65) Prior Publication Data
US 2014/0082387 A1     Mar. 20, 2014

Related U.S. Application Data

(63) Continuation of application No. PCT/CN2012/080781, filed on Aug. 30, 2012.

(51) Int. Cl.
*G06F 1/00* (2006.01)
*G06F 1/32* (2006.01)

(52) U.S. Cl.
CPC ............ *G06F 1/324* (2013.01); *G06F 1/3206* (2013.01); *G06F 1/3243* (2013.01); *G06F 1/3287* (2013.01); *Y02B 60/1239* (2013.01); *Y02B 60/1282* (2013.01)

(58) Field of Classification Search
CPC .... G06F 1/324; G06F 1/3206; G06F 1/3243; G06F 1/3287; Y02B 60/1239; Y02B 60/1282
USPC ......................................................... 713/322
See application file for complete search history.

(56) References Cited

U.S. PATENT DOCUMENTS 6,711,691 B1    3/2004   Howard et al.
8,490,103 B1 *  7/2013   Belady ................. G06F 1/3243
                                                    713/300

(Continued)

FOREIGN PATENT DOCUMENTS

CN       1567180 A       1/2005
CN     101414268 A       4/2009

(Continued)

OTHER PUBLICATIONS

Foreign Communication From a Counterpart Application, Chinese Application No. 201280002869.9, Chinese Office Action dated Aug. 4, 2014, 5 pages.

(Continued)

*Primary Examiner* — Robert Cassity
(74) *Attorney, Agent, or Firm* — Conley Rose, P.C.; Grant Rudolph

(57) ABSTRACT

A method for controlling a central processing unit (CPU), where the method includes: acquiring a usage rate and an operating frequency of one CPU of operating CPUs; if the operating frequency of the one CPU is smaller than a core off-line frequency, multiplying the usage rate of the one CPU by a first weight to obtain a CPU power consumption sensitive factor corresponding to the one CPU; if the operating frequency of the one CPU is greater than or equal to the core off-line frequency, multiplying the usage rate of the one CPU by a second weight to obtain a CPU power consumption sensitive factor corresponding to the one CPU; and turning off at least one operating CPU if the mean is smaller than a CPU turn-off power consumption sensitive factor threshold.

24 Claims, 6 Drawing Sheets

(56) References Cited

U.S. PATENT DOCUMENTS

| | | | |
|---|---|---|---|
| 2003/0115495 A1* | 6/2003 | Rawson, III | G06F 1/3228 713/324 |
| 2006/0036878 A1* | 2/2006 | Rothman | G06F 1/329 713/300 |
| 2010/0153763 A1 | 6/2010 | Sood | |
| 2011/0093724 A1* | 4/2011 | Park | G06F 1/3203 713/300 |
| 2012/0216064 A1 | 8/2012 | Ko et al. | |
| 2013/0179710 A1 | 7/2013 | Chang et al. | |

FOREIGN PATENT DOCUMENTS

| | | |
|---|---|---|
| CN | 101436098 A | 5/2009 |
| CN | 101853066 A | 10/2010 |
| CN | 102566739 A | 7/2012 |
| EP | 2372962 A1 | 5/2011 |
| JP | 11202988 A | 7/1999 |
| JP | 20090223687 A | 10/2009 |
| WO | 2012107565 A1 | 8/2012 |

OTHER PUBLICATIONS

Foreign Communication From a Counterpart Application, European Application No. 12876596.3, Extended European Search Report dated Jul. 25, 2014, 8 pages.
Foreign Communication From a Counterpart Application, PCT Application No. PCT/CN2012/080765, Chinese Search Report dated May 23, 2013, 6 pages.
Foreign Communication From a Counterpart Application, PCT Application No. PCT/CN2012/080765, Chinese Written Opinion dated May 23, 2013, 4 pages.
Foreign Communication From a Counterpart Application, PCT Application No. PCT/CN2012/080781, Chinese Search Report dated Jun. 6, 2013, 6 pages.
Foreign Communication From a Counterpart Application, PCT Application No. PCT/CN2012/080781, Chinese Written Opinion dated Jun. 6, 2013, 6 pages.
Partial English Translation and Abstract of Chinese Patent Application No. CN101414268A, Apr. 30, 2014, 2 pages.
Partial English Translation and Abstract of Chinese Patent Application No. CN101436098A, Apr. 30, 2014, 4 pages.
Partial English Translation and Abstract of Chinese Patent Application No. CNO01567180A, Part 1, Feb. 17, 2014, 4 pages.
Partial English Translation and Abstract of Chinese Patent Application No. CN001567180A, Part 2, Feb. 17, 2014, 2 pages.
Partial English Translation and Abstract of Chinese Patent Application No. CN101853066A, Part 1, Feb. 17, 2014, 5 pages.
Partial English Translation and Abstract of Chinese Patent Application No. CN101853066A, Part 2, Feb. 17, 2014, 3 pages.
Partial English Translation and Abstract of Japanese Patent Application No. JP2009223687A, Mar. 6, 2015, 10 pages.
Partial English Translation and Abstract of Japanese Patent Application No. JPH11202988A, Mar. 6, 2015, 7 pages.
Foreign Communication From a Counterpart Application, Japanese Application No. 2014-532228, Japanese Office Action dated Jan. 27, 2015, 3 pages.
Foreign Communication From a Counterpart Application, Japanese Application No. 2014-532228, English Translation of Japanese Office Action dated Jan. 27, 2015, 4 pages.

* cited by examiner

METHOD AND APPARATUS FOR CONTROLLING CENTRAL PROCESSING UNIT IN A GROUP OF CENTRAL PROCESSING UNITS BY ACQUIRING POWER CONSUMPTION FACTORS FOR EACH CENTRAL PROCESSING UNIT AND COMPARING A MEAN OF POWER CONSUMPTION FACTORS WITH A THRESHOLD

CROSS-REFERENCE TO RELATED APPLICATIONS

This application is a continuation of International Application No. PCT/CN2012/080781, filed on Aug. 30, 2012, which is hereby incorporated by reference in its entirety.

TECHNICAL FIELD

The present invention relates to the field of communications, and in particular, to a method and an apparatus for controlling a central processing unit.

BACKGROUND

With the continuous increasing of computation demands and especially the field of mobile computing, processors develop towards high dominant frequencies and multiple cores, so that a parallel processing capability within a unit time is significantly increased, and at the same time, a heavy power consumption load also occurs. A conventional single-core processor regulation manner is no longer applicable to a multi-core processor. For a computing system, and especially a mobile handheld computing device, it is of great significance to reduce a problem of ineffective power consumption of a processor.

In the prior art, one technical solution is proposed, in which intelligent management is performed on CPU hot swapping according to information such as a usage rate and the number of real-time processes of a central processing unit (CPU), so as to reduce power consumption of a multi-core processor, and at the same time, reduce influences on CPU performance. Specifically, when the number of real-time processes in a system is greater than 1 and smaller than 5, the number of CPUs that are turned on is the number of the real-time processes. When the number of real-time processes in a system is greater than or equal to 5, turn on all CPUs. However, because of the "burst" characteristic of a real-time process and a CPU use rate of a system, the technical solution easily causes that CPUs are frequently turned on and off within a short time, which goes against reduction of power consumption of the system.

SUMMARY

Embodiments of the present invention provide a method and an apparatus for controlling a central processing unit, which may reduce electrical power consumption caused by that a CPU is frequently turned on and/or off within a short time.

According to a first aspect of the present invention, a method for controlling a CPU includes: acquiring a usage rate and an operating frequency of one CPU of operating CPUs, where the number of the operating CPUs is M, and M is a positive integer greater than or equal to two; determining whether the operating frequency of the one CPU is smaller than a core off-line frequency; if the operating frequency of the one CPU is smaller than the core off-line frequency, multiplying the usage rate of the one CPU by a first weight to obtain a CPU power consumption sensitive factor corresponding to the one CPU; if the operating frequency of the one CPU is greater than or equal to the core off-line frequency, multiplying the usage rate of the one CPU by a second weight to obtain a CPU power consumption sensitive factor corresponding to the one CPU, where the first weight and the second weight are not equal and are both positive integers greater than or equal to one; executing the foregoing steps N times for each of M operating CPUs, where N is a positive integer greater than or equal to one; acquiring M×N CPU power consumption sensitive factors after the foregoing steps are executed N times; acquiring a mean of the M×N CPU power consumption sensitive factors; and turning off at least one operating CPU if the mean is smaller than a CPU turn-off power consumption sensitive factor threshold.

In a first possible implementation manner of the first aspect, the executing the foregoing steps N times for each of M operating CPUs includes executing the foregoing steps N times for an $n^{th}$ operating CPU, where n is greater than or equal to one and is smaller than or equal to M.

In combination with the first possible implementation manner of the first aspect, in a second possible implementation manner, the executing the foregoing steps N times for an $n^{th}$ operating CPU includes when a timing moment of a timer n corresponding to the $n^{th}$ operating CPU arrives, executing the foregoing steps, so that when the timing moment of the timer n arrives N times consecutively, the foregoing steps are executed N times.

In combination with the second possible implementation manner of the first aspect, in a third possible implementation manner, the method further includes when a system is idle, stopping, by the timer, timing.

In combination with the second possible implementation manner of the first aspect, in a fourth possible implementation manner, or in combination with the third possible implementation manner of the first aspect, in a fifth possible implementation manner, the method further includes when the system is not idle, starting, by the timer, timing.

In combination with the first aspect of the present invention, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, the turning off at least one operating CPU if the mean is smaller than a CPU turn-off power consumption sensitive factor threshold includes if the mean is smaller than the CPU turn-off power consumption sensitive factor threshold, and the number of queue tasks running on the operating CPUs is smaller than M, turning off at least one operating CPU.

According to a second aspect of the present invention, a method for controlling a CPU includes: acquiring a usage rate and an operating frequency of one CPU of operating CPUs, where the number of the operating CPUs is M, and M is a positive integer greater than or equal to two; determining whether the operating frequency of the one CPU is smaller than a core off-line frequency; if the operating frequency of the one CPU is smaller than the core off-line frequency, multiplying the usage rate of the one CPU by a first weight to obtain a CPU power consumption sensitive factor corresponding to the one CPU; if the operating frequency of the one CPU is greater than or equal to the core off-line frequency, multiplying the usage rate of the one CPU by a second weight to obtain a CPU power consumption sensitive factor corresponding to the one CPU, where the first weight and the second weight are not equal and are both positive integers greater than or equal to one; executing the foregoing steps N times for the one CPU, where N is a positive integer greater than or equal to one; acquiring N CPU power consumption sensitive factors after the foregoing steps are executed N times; acquiring a mean of the N CPU power consumption sensitive factors; and turning off at least one operating CPU if the mean is smaller than a CPU turn-off power consumption sensitive factor threshold.

In a first possible implementation manner of the second aspect, the executing the foregoing steps N times for the one CPU includes when a timing moment of a timer a corresponding to the one CPU arrives, executing the foregoing steps, so that when the timing moment of the timer a arrives N times consecutively, the foregoing steps are executed N times.

In combination with the first possible implementation manner of the second aspect, in a second possible implementation manner, the method further includes when a system is idle, stopping, by the timer, timing.

In combination with the second possible implementation manner of the second aspect, in a third possible implementation manner, or in combination with the third possible implementation manner of the second aspect, in a fourth possible implementation manner, the method further includes when the system is not idle, starting, by the timer, timing.

In combination with the second aspect of the present invention, or the first possible implementation manner of the second aspect, or the second possible implementation manner of the second aspect, or the third possible implementation manner of the second aspect, or the fourth possible implementation manner of the second aspect, in a fifth possible implementation manner, the turning off at least one operating CPU if the mean is smaller than a CPU turn-off power consumption sensitive factor threshold includes if the mean is smaller than the CPU turn-off power consumption sensitive factor threshold, and the number of queue tasks running on the operating CPUs is smaller than M, turning off at least one operating CPU.

According to a third aspect of the present invention, a method for controlling a CPU includes: acquiring a usage rate and an operating frequency of one CPU of operating CPUs, where the number of the operating CPUs is M, M is a positive integer greater than or equal to one, and the number of CPUs in a non-operating state is greater than or equal to one; determining whether the operating frequency of the one CPU is greater than a core on-line frequency; if the operating frequency of the one CPU is greater than the core on-line frequency, multiplying the usage rate of the one CPU by a first weight to obtain a CPU power consumption sensitive factor corresponding to the one CPU; if the operating frequency of the one CPU is smaller than or equal to the core on-line frequency, multiplying the usage rate of the one CPU by a second weight to obtain a CPU power consumption sensitive factor corresponding to the one CPU, where the first weight and the second weight are not equal and are both positive integers greater than or equal to one; executing the foregoing steps for M operating CPUs, and repeating N times, where N is a positive integer greater than or equal to one; acquiring M×N CPU power consumption sensitive factors after the foregoing steps are executed N times; acquiring a mean of the M×N CPU power consumption sensitive factors; and turning on at least one CPU in a non-operating state if the mean is greater than a CPU turn-on power consumption sensitive factor threshold.

In a first possible implementation manner of the third aspect, the executing the foregoing steps N times for each of M operating CPUs includes executing the foregoing steps N times for an $n^{th}$ operating CPU, where n is greater than or equal to one and is smaller than or equal to M.

In combination with the first possible implementation manner of the third aspect, in a second possible implementation manner, the executing the foregoing steps N times for an $n^{th}$ operating CPU includes when a timing moment of a timer n corresponding to the $n^{th}$ operating CPU arrives, executing the foregoing steps, so that when the timing moment of the timer n arrives N times consecutively, the foregoing steps are executed N times.

In combination with the second possible implementation manner of the third aspect, in a third possible implementation manner, the method further includes when a system is idle, stopping, by the timer, timing.

In combination with the second possible implementation manner of the third aspect, in a fourth possible implementation manner, or in combination with the third possible implementation manner of the third aspect, in a fifth possible implementation manner, the method further includes when the system is not idle, starting, by the timer, timing.

In combination with the second possible implementation manner of the third aspect, or the third possible implementation manner of the third aspect of the present invention, or the fourth possible implementation manner of the third aspect of the present invention, or the fifth possible implementation manner of the third aspect of the present invention, in a sixth possible implementation manner, the method further includes if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, stopping, by the timer, timing.

In combination with the sixth possible implementation manner of the third aspect, in a seventh possible implementation manner, the maximum frequency lasting period time threshold is: (the CPU turn-on power consumption sensitive factor threshold×N)/(a usage rate threshold×a frequency weight), where the frequency weight is the first weight; and that the number of times that the operating frequencies are all maximum frequency values is just greater than a maximum frequency lasting period time threshold is the number of times that the operating frequencies are all maximum frequency values is the maximum frequency lasting period time threshold plus one.

In combination with the third aspect of the present invention, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, in an eighth possible implementation manner, the turning on at least one CPU in a non-operating state if the mean is greater than a CPU turn-on power consumption sensitive factor threshold includes if the mean is greater than the CPU turn-on power consumption sensitive factor threshold, and the number of queue tasks running on the operating CPUs is greater than M, turning on at least one CPU in a non-operating state.

According to a fourth aspect of the present invention, a method for controlling a CPU includes: acquiring a usage rate and an operating frequency of one CPU of operating CPUs, where the number of the operating CPUs is M, M is a positive integer greater than or equal to one, and the number of CPUs in a non-operating state is greater than or equal to one; determining whether the operating frequency of the one CPU is greater than a core on-line frequency; if the operating frequency of the one CPU is greater than the core on-line frequency, multiplying the usage rate of the one CPU by a first weight to obtain a CPU power consumption sensitive factor corresponding to the one CPU; if the operating frequency of the one CPU is smaller than or equal to the core on-line frequency, multiplying the usage rate of the one CPU by a second weight to obtain a CPU power consumption sensitive factor corresponding to the one CPU, where the first weight and the second weight are not equal and are both positive integers greater than or equal to one; executing the foregoing steps N times for the one CPU, where N is a positive integer greater than or equal to one; acquiring N CPU power consumption sensitive factors after the foregoing steps are executed N times; acquiring a mean of the N CPU power consumption sensitive factors; and turning on at least one CPU in a non-operating state if the mean is greater than a CPU turn-on power consumption sensitive factor threshold.

In a first possible implementation manner of the fourth aspect, the executing the foregoing steps N times for the one CPU includes when a timing moment of a timer a corresponding to the one CPU arrives, executing the foregoing steps, so that when the timing moment of the timer a arrives N times consecutively, the foregoing steps are executed N times.

In combination with the first possible implementation manner of the fourth aspect, in a second possible implementation manner, the method further includes when a system is idle, stopping, by the timer, timing.

In combination with the first possible implementation manner of the fourth aspect, or the second possible implementation manner of the fourth aspect, in a third possible implementation manner, the method further includes when the system is not idle, starting, by the timer, timing.

In combination with the first possible implementation manner of the fourth aspect, or the second possible implementation manner of the fourth aspect of the present invention, or the third possible implementation manner of the fourth aspect of the present invention, in a fifth possible implementation manner, the method further includes if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, stopping, by the timer, timing.

In combination with the fifth possible implementation manner of the fourth aspect, in a sixth possible implementation manner, the maximum frequency lasting period time threshold is: (the CPU turn-on power consumption sensitive factor threshold×N)/(a usage rate threshold×a frequency weight), where the frequency weight is the first weight; and that the number of times that the operating frequencies are all maximum frequency values is just greater than a maximum frequency lasting period time threshold is the number of times that the operating frequencies are all maximum frequency values is the maximum frequency lasting period time threshold plus one.

In combination with the fourth aspect of the present invention, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, in a seventh possible implementation manner, the turning on at least one CPU in a non-operating state if the mean is greater than a CPU turn-on power consumption sensitive factor threshold includes if the mean is greater than the CPU turn-on power consumption sensitive factor threshold, and the number of queue tasks running on the operating CPUs is greater than M, turning on at least one CPU in a non-operating state.

According to a fifth aspect of the present invention, a terminal includes a processor, where the processor is configured to: acquire a usage rate and an operating frequency of one CPU of operating CPUs, where the number of the operating CPUs is M, and M is a positive integer greater than or equal to two; determine whether the operating frequency of the one CPU is smaller than a core off-line frequency; if the operating frequency of the one CPU is smaller than the core off-line frequency, multiply the usage rate of the one CPU by a first weight to obtain a CPU power consumption sensitive factor corresponding to the one CPU; if the operating frequency of the one CPU is greater than or equal to the core off-line frequency, multiply the usage rate of the one CPU by a second weight to obtain a CPU power consumption sensitive factor corresponding to the one CPU, where the first weight and the second weight are not equal and are both positive integers greater than or equal to one; execute the foregoing steps N times for each of M operating CPUs, where N is a positive integer greater than or equal to one; acquire M×N CPU power consumption sensitive factors after the foregoing steps are executed N times; acquire a mean of the M×N CPU power consumption sensitive factors; and turn off at least one operating CPU if the mean is smaller than a CPU turn-off power consumption sensitive factor threshold.

In a first possible implementation manner of the fifth aspect, that the processor executes the foregoing steps N times for each of M operating CPUs includes executing the foregoing steps N times for an $n^{th}$ operating CPU, where n is greater than or equal to one and is smaller than or equal to M.

In combination with the first possible implementation manner of the fifth aspect, in a second possible implementation manner, that the processor executes the foregoing steps N times for an $n^{th}$ operating CPU includes when a timing moment of a timer n corresponding to the $n^{th}$ operating CPU arrives, executing the foregoing steps, so that when the timing moment of the timer n arrives N times consecutively, the foregoing steps are executed N times.

In combination with the second possible implementation manner of the fifth aspect, in a third possible implementation manner, the processor is further configured to when a system is idle, control the timer to stop timing.

In combination with the second possible implementation manner of the fifth aspect, in a fourth possible implementation manner; or in combination with the third possible implementation manner of the fifth aspect, in a fifth possible implementation manner, the processor is further configured to when the system is not idle, control the timer to start timing.

In combination with the fifth aspect of the present invention, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner, the turning off at least one operating CPU if the mean is smaller than a CPU turn-off power consumption sensitive factor threshold includes if the mean is smaller than the CPU turn-off power consumption sensitive factor threshold, and the number of queue tasks running on the operating CPUs is smaller than M, turning off at least one operating CPU.

According to a sixth aspect of the present invention, a terminal includes a processor, where the processor is configured to: acquire a usage rate and an operating frequency of one CPU of operating CPUs, where the number of the operating CPUs is M, and M is a positive integer greater than or equal to two; determine whether the operating frequency of the one CPU is smaller than a core off-line frequency; if the operating frequency of the one CPU is smaller than the core off-line frequency, multiply the usage rate of the one CPU by a first weight to obtain a CPU power consumption sensitive factor corresponding to the one CPU; if the operating frequency of the one CPU is greater than or equal to the core off-line frequency, multiply the usage rate of the one CPU by a second weight to obtain a CPU power consumption sensitive factor corresponding to the one CPU, where the first weight and the second weight are not equal and are both positive integers greater than or equal to one; execute the foregoing steps N times for the one CPU, where N is a positive integer greater than or equal to one; acquire N CPU power consumption sensitive factors after the foregoing steps are executed N times; acquire a mean of the N CPU power consumption sensitive factors; and turn off at least one operating CPU if the mean is smaller than a CPU turn-off power consumption sensitive factor threshold.

In a first possible implementation manner of the sixth aspect, that the processor executes the foregoing steps N times for the one CPU includes when a timing moment of a timer a corresponding to the one CPU arrives, executing the foregoing steps, so that when the timing moment of the timer a arrives N times consecutively, the foregoing steps are executed N times.

In combination with the first possible implementation manner of the sixth aspect, in a second possible implementation manner, the processor is further configured to when a system is idle, control the timer to stop timing.

In combination with the second possible implementation manner of the sixth aspect, in a third possible implementation manner, or in combination with the third possible implementation manner of the sixth aspect, in a fourth possible implementation manner, the processor is further configured to when the system is not idle, control the timer to start timing.

In combination with the sixth aspect of the present invention, or the first possible implementation manner of the sixth aspect, or the second possible implementation manner of the sixth aspect, or the third possible implementation manner of the sixth aspect, or the fourth possible implementation manner of the sixth aspect, in a fifth possible implementation manner, that the processor turns off at least one operating CPU when the mean is smaller than a CPU turn-off power consumption sensitive factor threshold includes if the mean is smaller than the CPU turn-off power consumption sensitive factor threshold, and the number of queue tasks running on the operating CPUs is smaller than M, turning off at least one operating CPU.

According to a seventh aspect of the present invention, a terminal includes a processor, where the processor is configured to: acquire a usage rate and an operating frequency of one CPU of operating CPUs, where the number of the operating CPUs is M, M is a positive integer greater than or equal to one, and the number of CPUs in a non-operating state is greater than or equal to one; determine whether the operating frequency of the one CPU is greater than a core on-line frequency; if the operating frequency of the one CPU is greater than the core on-line frequency, multiply the usage rate of the one CPU by a first weight to obtain a CPU power consumption sensitive factor corresponding to the one CPU; if the operating frequency of the one CPU is smaller than or equal to the core on-line frequency, multiply the usage rate of the one CPU by a second weight to obtain a CPU power consumption sensitive factor corresponding to the one CPU, where the first weight and the second weight are not equal and are both positive integers greater than or equal to one; execute the foregoing steps for M operating CPUs, and repeat N times, where N is a positive integer greater than or equal to one; acquire M×N CPU power consumption sensitive factors after the foregoing steps are executed N times; acquire a mean of the M×N CPU power consumption sensitive factors; and turn on at least one CPU in a non-operating state if the mean is greater than a CPU turn-on power consumption sensitive factor threshold.

In a first possible implementation manner of the seventh aspect, that the processor executes the foregoing steps N times for each of M operating CPUs includes executing the foregoing steps N times for an $n^{th}$ operating CPU, where n is greater than or equal to one and is smaller than or equal to M.

In combination with the first possible implementation manner of the seventh aspect, in a second possible implementation manner, that the processor executes the foregoing steps N times for an $n^{th}$ operating CPU includes when a timing moment of a timer n corresponding to the $n^{th}$ operating CPU arrives, executing the foregoing steps, so that when the timing moment of the timer n arrives N times consecutively, the foregoing steps are executed N times.

In combination with the second possible implementation manner of the seventh aspect, in a third possible implementation manner, the processor is further configured to when a system is idle, control the timer to stop timing.

In combination with the second possible implementation manner of the seventh aspect, in a fourth possible implementation manner, or in combination with the third possible implementation manner of the seventh aspect, in a fifth possible implementation manner, the processor is further configured to when the system is not idle, control the timer to start timing.

In combination with the second possible implementation manner of the seventh aspect, or the third possible implementation manner of the seventh aspect of the present invention, or the fourth possible implementation manner of the seventh aspect of the present invention, or the fifth possible implementation manner of the seventh aspect of the present invention, in a sixth possible implementation manner, the processor is further configured to if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, control the timer to stop timing.

In combination with the sixth possible implementation manner of the seventh aspect, in a seventh possible implementation manner, the maximum frequency lasting period time threshold is: (the CPU turn-on power consumption sensitive factor threshold×N)/(a usage rate threshold×a frequency weight), where the frequency weight is the first weight; and that the number of times that the operating frequencies are all maximum frequency values is just greater than a maximum frequency lasting period time threshold is: the number of times that the operating frequencies are all maximum frequency values is the maximum frequency lasting period time threshold plus one.

In combination with the seventh aspect of the present invention, or the first possible implementation manner of the seventh aspect, or the second possible implementation manner of the seventh aspect, or the third possible implementation manner of the seventh aspect, or the fourth possible implementation manner of the seventh aspect, or the fifth possible implementation manner of the seventh aspect, or the sixth possible implementation manner of the seventh aspect, or the seventh possible implementation manner of the seventh aspect, in an eighth possible implementation manner, that the processor turns on at least one CPU in a non-operating state when the mean is greater than a CPU turn-on power consumption sensitive factor threshold includes if the mean is greater than the CPU turn-on power consumption sensitive factor threshold, and the number of queue tasks running on the operating CPUs is greater than M, turning on at least one CPU in a non-operating state.

According to an eighth aspect of the present invention, a terminal includes a processor, where the processor is configured to: acquire a usage rate and an operating frequency of one CPU of operating CPUs, where the number of the operating CPUs is M, M is a positive integer greater than or equal to one, and the number of CPUs in a non-operating state is greater than or equal to one; determine whether the operating frequency of the one CPU is greater than a core on-line frequency; if the operating frequency of the one CPU is greater than the core on-line frequency, multiply the usage rate of the one CPU by a first weight to obtain a CPU power consumption sensitive factor corresponding to the one CPU; if the operating frequency of the one CPU is smaller than or equal to the core on-line frequency, multiply the usage rate of the one CPU by a second weight to obtain a CPU power consumption sensitive factor corresponding to the one CPU, where the first weight and the second weight are not equal and are both positive integers greater than or equal to one; execute the foregoing steps N times for the one CPU, where N is a positive integer greater than or equal to one; acquire N CPU power consumption sensitive factors after the foregoing steps are executed N times; acquire a mean of the N CPU power consumption sensitive factors; and turn on at least one CPU in a non-operating state if the mean is greater than a CPU turn-on power consumption sensitive factor threshold.

In a first possible implementation manner of the eighth aspect, that the processor executes the foregoing steps N times for the one CPU includes when a timing moment of a timer a corresponding to the one CPU arrives, executing the foregoing steps, so that when the timing moment of the timer a arrives N times consecutively, the foregoing steps are executed N times.

In combination with the first possible implementation manner of the eighth aspect, in a second possible implementation manner, the processor is further configured to when a system is idle, control the timer to stop timing.

In combination with the first possible implementation manner of the eighth aspect, or the second possible implementation manner of the eighth aspect, in a third possible implementation manner, the processor is further configured to when the system is not idle, control the timer to start timing.

In combination with the first possible implementation manner of the eighth aspect, or the second possible implementation manner of the eighth aspect of the present invention, or the third possible implementation manner of the eighth aspect of the present invention, in a fifth possible implementation manner, the processor is further configured to if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, control the timer to stop timing.

In combination with the fifth possible implementation manner of the eighth aspect, in a sixth possible implementation manner, the maximum frequency lasting period time threshold is: (the CPU turn-on power consumption sensitive factor threshold×N)/(a usage rate threshold×a frequency weight), where the frequency weight is the first weight; and that the number of times that the operating frequencies are all maximum frequency values is just greater than a maximum frequency lasting period time threshold is the number of times that the operating frequencies are all maximum frequency values is the maximum frequency lasting period time threshold plus one.

In combination with the eighth aspect of the present invention, or the first possible implementation manner of the eighth aspect, or the second possible implementation manner of the eighth aspect, or the third possible implementation manner of the eighth aspect, or the fourth possible implementation manner of the eighth aspect, or the fifth possible implementation manner of the eighth aspect, or the sixth possible implementation manner of the eighth aspect, in a seventh possible implementation manner, that the processor turns on at least one CPU in a non-operating state when the mean is greater than a CPU turn-on power consumption sensitive factor threshold includes when the mean is greater than the CPU turn-on power consumption sensitive factor threshold, and the number of queue tasks running on the operating CPUs is greater than M, turning on at least one CPU in a non-operating state.

According to a ninth aspect of the present invention, an apparatus includes: a first unit configured to acquire a usage rate and an operating frequency of one CPU of operating CPUs, where the number of the operating CPUs is M, and M is a positive integer greater than or equal to two; a second unit configured to determine whether the operating frequency of the one CPU is smaller than a core off-line frequency; a third unit configured to, when the operating frequency of the one CPU is smaller than the core off-line frequency, multiply the usage rate of the one CPU by a first weight to obtain a CPU power consumption sensitive factor corresponding to the one CPU; a fourth unit configured to, when the operating frequency of the one CPU is greater than or equal to the core off-line frequency, multiply the usage rate of the one CPU by a second weight to obtain a CPU power consumption sensitive factor corresponding to the one CPU, where the first weight and the second weight are not equal and are both positive integers greater than or equal to one; a fifth unit configured to execute the foregoing steps N times for each of M operating CPUs, where N is a positive integer greater than or equal to one; and acquire M×N CPU power consumption sensitive factors after the foregoing steps are executed N times; a sixth unit configured to acquire a mean of the M×N CPU power consumption sensitive factors; and a seventh unit configured to turn off at least one operating CPU when the mean is smaller than a CPU turn-off power consumption sensitive factor threshold.

In a first possible implementation manner of the ninth aspect, that the fifth unit executes the foregoing steps N times for each of M operating CPUs includes executing the foregoing steps N times for an $n^{th}$ operating CPU, where n is greater than or equal to one and is smaller than or equal to M.

In combination with the first possible implementation manner of the ninth aspect, in a second possible implementation manner, a timer n corresponding to the $n^{th}$ operating CPU is further included, and that the fifth unit executes the foregoing steps N times for an $n^{th}$ operating CPU includes when a timing moment of the timer n corresponding to the $n^{th}$ operating CPU arrives, executing the foregoing steps, so that when the timing moment of the timer n arrives N times consecutively, the foregoing steps are executed N times.

In combination with the second possible implementation manner of the ninth aspect, in a third possible implementation manner, the apparatus further includes an eighth unit configured to, when a system is idle, control the timer to stop timing.

In combination with the second possible implementation manner of the ninth aspect, in a fourth possible implementation manner, or in combination with the third possible implementation manner of the ninth aspect, in a fifth possible implementation manner, the apparatus further includes a ninth unit configured to, when the system is not idle, control the timer to start timing.

In combination with the ninth aspect of the present invention, or the first possible implementation manner of the ninth aspect, or the second possible implementation manner of the ninth aspect, or the third possible implementation manner of the ninth aspect, or the fourth possible implementation manner of the ninth aspect, or the fifth possible implementation manner of the ninth aspect, in a sixth possible implementation manner, the seventh unit is specifically configured to when the mean is smaller than the CPU turn-off power consumption sensitive factor threshold, and the number of queue tasks running on the operating CPUs is smaller than M, turn off at least one operating CPU.

According to a tenth aspect of the present invention, an apparatus includes: a first unit configured to acquire a usage rate and an operating frequency of one CPU of operating CPUs, where the number of the operating CPUs is M, and M is a positive integer greater than or equal to two; a second unit configured to determine whether the operating frequency of the one CPU is smaller than a core off-line frequency; a third unit configured to, when the operating frequency of the one CPU is smaller than the core off-line frequency, multiply the usage rate of the one CPU by a first weight to obtain a CPU power consumption sensitive factor corresponding to the one CPU; a fourth unit configured to, when the operating frequency of the one CPU is greater than or equal to the core off-line frequency, multiply the usage rate of the one CPU by a second weight to obtain a CPU power consumption sensitive factor corresponding to the one CPU, where the first weight and the second weight are not equal and are both positive integers greater than or equal to one; a fifth unit configured to execute the foregoing steps N times for the one CPU, where N is a positive integer greater than or equal to one, and acquire N CPU power consumption sensitive factors after the foregoing steps are executed N times; a sixth unit configured to acquire a mean of the N CPU power consumption sensitive factors; and a seventh unit configured to turn off at least one operating CPU when the mean is smaller than a CPU turn-off power consumption sensitive factor threshold.

In a first possible implementation manner of the tenth aspect, a timer a corresponding to the one CPU is further included, and that the fifth unit executes the foregoing steps N times for the one CPU includes when a timing moment of the timer a corresponding to the one CPU arrives, executing the foregoing steps, so that when the timing moment of the timer a arrives N times consecutively, the foregoing steps are executed N times.

In combination with the first possible implementation manner of the tenth aspect, in a second possible implementation manner, the apparatus further includes an eighth unit configured to, when a system is idle, control the timer to stop timing.

In combination with the second possible implementation manner of the tenth aspect, in a third possible implementation manner; or in combination with the third possible implementation manner of the tenth aspect, in a fourth possible implementation manner, the apparatus further includes a ninth unit configured to, when the system is not idle, control the timer to start timing.

In combination with the tenth aspect of the present invention, or the first possible implementation manner of the tenth aspect, or the second possible implementation manner of the tenth aspect, or the third possible implementation manner of the tenth aspect, or the fourth possible implementation manner of the tenth aspect, in a fifth possible implementation manner, the seventh unit is specifically configured to if the mean is smaller than the CPU turn-off power consumption sensitive factor threshold, and the number of queue tasks running on the operating CPUs is smaller than M, turn off at least one operating CPU.

According to an eleventh aspect of the present invention, an apparatus includes: a first unit configured to acquire a usage rate and an operating frequency of one CPU of operating CPUs, where the number of the operating CPUs is M, M is a positive integer greater than or equal to one, and the number of CPUs in a non-operating state is greater than or equal to one; a second unit configured to determine whether the operating frequency of the one CPU is greater than a core on-line frequency; a third unit configured to, when the operating frequency of the one CPU is greater than the core on-line frequency, multiply the usage rate of the one CPU by a first weight to obtain a CPU power consumption sensitive factor corresponding to the one CPU; a fourth unit configured to, when the operating frequency of the one CPU is smaller than or equal to the core on-line frequency, multiply the usage rate of the one CPU by a second weight to obtain a CPU power consumption sensitive factor corresponding to the one CPU, where the first weight and the second weight are not equal and are both positive integers greater than or equal to one; a fifth unit configured to execute the foregoing steps for M operating CPUs, and repeat N times, where N is a positive integer greater than or equal to one; and acquire M×N CPU power consumption sensitive factors after the foregoing steps are executed N times; a sixth unit configured to acquire a mean of the M×N CPU power consumption sensitive factors; and a seventh unit configured to turn on at least one CPU in a non-operating state when the mean is greater than a CPU turn-on power consumption sensitive factor threshold.

In a first possible implementation manner of the eleventh aspect, that the fifth unit executes the foregoing steps N times for each of M operating CPUs includes executing the foregoing steps N times for an $n^{th}$ operating CPU, where n is greater than or equal to one and is smaller than or equal to M.

In combination with the first possible implementation manner of the eleventh aspect, in a second possible implementation manner, a timer n corresponding to the $n^{th}$ operating CPU is further included, and that the fifth unit executes the foregoing steps N times for an $n^{th}$ operating CPU includes when a timing moment of the timer n corresponding to the $n^{th}$ operating CPU arrives, executing the foregoing steps, so that when the timing moment of the timer n arrives N times consecutively, the foregoing steps are executed N times.

In combination with the second possible implementation manner of the eleventh aspect, in a third possible implementation manner, the apparatus further includes an eighth unit configured to, when a system is idle, control the timer to stop timing.

In combination with the second possible implementation manner of the eleventh aspect, in a fourth possible implementation manner, or in combination with the third possible implementation manner of the eleventh aspect, in a fifth possible implementation manner, the apparatus further includes a ninth unit configured to, when the system is not idle, control the timer to start timing.

In combination with the second possible implementation manner of the eleventh aspect, or the third possible implementation manner of the eleventh aspect of the present invention, or the fourth possible implementation manner of the eleventh aspect of the present invention, or the fifth possible implementation manner of the eleventh aspect of the present invention, in a sixth possible implementation manner, the apparatus further includes a tenth unit configured to, if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, control the timer to stop timing.

In combination with the sixth possible implementation manner of the eleventh aspect, in a seventh possible implementation manner, the maximum frequency lasting period time threshold is: (the CPU turn-on power consumption sensitive factor threshold×N)/(a usage rate threshold×a frequency weight), where the frequency weight is the first weight; and that the number of times that the operating frequencies are all maximum frequency values is just greater than a maximum frequency lasting period time threshold is the number of times that the operating frequencies are all maximum frequency values is the maximum frequency lasting period time threshold plus one.

In combination with the eleventh aspect of the present invention, or the first possible implementation manner of the eleventh aspect, or the second possible implementation manner of the eleventh aspect, or the third possible implementation manner of the eleventh aspect, or the fourth possible implementation manner of the eleventh aspect, or the fifth possible implementation manner of the eleventh aspect, or the sixth possible implementation manner of the eleventh aspect, or the seventh possible implementation manner of the eleventh aspect, in an eighth possible implementation manner, the seventh unit is specifically configured to when the mean is greater than the CPU turn-on power consumption sensitive factor threshold, and the number of queue tasks running on the operating CPUs is greater than M, turn on at least one CPU in a non-operating state.

According to a twelfth aspect of the present invention, an apparatus includes: a first unit configured to acquire a usage rate and an operating frequency of one CPU of operating CPUs, where the number of the operating CPUs is M, M is a positive integer greater than or equal to one, and the number of CPUs in a non-operating state is greater than or equal to one; a second unit configured to determine whether the operating frequency of the one CPU is greater than a core on-line frequency; a third unit configured to, when the operating frequency of the one CPU is greater than the core on-line frequency, multiply the usage rate of the one CPU by a first weight to obtain a CPU power consumption sensitive factor corresponding to the one CPU; a fourth unit configured to, when the operating frequency of the one CPU is smaller than or equal to the core on-line frequency, multiply the usage rate of the one CPU by a second weight to obtain a CPU power consumption sensitive factor corresponding to the one CPU, where the first weight and the second weight are not equal and are both positive integers greater than or equal to one; a fifth unit configured to execute the foregoing steps N times for the one CPU, where N is a positive integer greater than or equal to one; and acquire N CPU power consumption sensitive factors after the foregoing steps are executed N times; a sixth unit configured to acquire a mean of the N CPU power consumption sensitive factors; a seventh unit configured to turn on at least one CPU in a non-operating state when the mean is greater than a CPU turn-on power consumption sensitive factor threshold.

In a first possible implementation manner of the twelfth aspect, a timer a corresponding to the one CPU is further included, and that the fifth unit executes the foregoing steps N times for the one CPU includes when a timing moment of the timer a corresponding to the one CPU arrives, executing the foregoing steps, so that when the timing moment of the timer a arrives N times consecutively, the foregoing steps are executed N times.

In combination with the first possible implementation manner of the twelfth aspect, in a second possible implementation manner, the apparatus further includes an eighth unit configured to, when a system is idle, control the timer to stop timing.

In combination with the first possible implementation manner of the twelfth aspect, or the second possible implementation manner of the twelfth aspect, in a third possible implementation manner, the apparatus further includes a ninth unit configured to, when the system is not idle, control the timer to start timing.

In combination with the first possible implementation manner of the twelfth aspect, or the second possible implementation manner of the twelfth aspect of the present invention, or the third possible implementation manner of the twelfth aspect of the present invention, in a fifth possible implementation manner, the apparatus further includes a tenth unit configured to, if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, control the timer to stop timing.

In combination with the fifth possible implementation manner of the twelfth aspect, in a sixth possible implementation manner, the maximum frequency lasting period time threshold is: (the CPU turn-on power consumption sensitive factor threshold×N)/(a usage rate threshold×a frequency weight), where the frequency weight is the first weight; and that the number of times that the operating frequencies are all maximum frequency values is just greater than a maximum frequency lasting period time threshold is the number of times that the operating frequencies are all maximum frequency values is the maximum frequency lasting period time threshold plus one.

In combination with the twelfth aspect of the present invention, or the first possible implementation manner of the twelfth aspect, or the second possible implementation manner of the twelfth aspect, or the third possible implementation manner of the twelfth aspect, or the fourth possible implementation manner of the twelfth aspect, or the fifth possible implementation manner of the twelfth aspect, or the sixth possible implementation manner of the twelfth aspect, in a seventh possible implementation manner, the seventh unit is specifically configured to if the mean is greater than the CPU turn-on power consumption sensitive factor threshold, and the number of queue tasks running on the operating CPUs is greater than M, turn on at least one CPU in a non-operating state.

According to a thirteen aspect of the present invention, a computer program carrying program codes is provided, where when the computer program is run on a computer, the program codes execute the method in combination with the first aspect of the present invention, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the second aspect of the present invention, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the third aspect of the present invention, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the fourth aspect of the present invention, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect.

According to a fourteenth aspect of the present invention, a computer readable storage medium is provided, where the computer readable storage medium stores computer program codes, and when the computer program codes are executed by a computer, the computer program codes may enable the computer to execute the method in combination with the first aspect of the present invention, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the second aspect of the present invention, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the third aspect of the present invention, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the fourth aspect of the present invention, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect.

According to a fifteenth aspect of the present invention, a computer program product is provided, where the computer program product includes computer program codes, and when the computer program codes are executed by a computer, the computer program codes may enable the computer to execute the method in combination with the first aspect of the present invention, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the second aspect of the present invention, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the third aspect of the present invention, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the fourth aspect of the present invention, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect.

It can be seen from the foregoing solutions that, in the method and the apparatus for controlling a central processing unit provided in the embodiments of the present invention, a weight concept is introduced. A weight is multiplied by a usage rate of a CPU to obtain a CPU power consumption sensitive factor, and a mean of CPU power consumption sensitive factors is calculated, and is compared with a CPU power consumption sensitive factor threshold. At least one operating CPU is turned off if the mean is smaller than a CPU turn-off power consumption sensitive factor threshold. Alternatively, at least one CPU in a non-operating state is turned on if the mean is greater than a CPU turn-on power consumption sensitive factor threshold. Therefore, by using a weight and a mean, it is ensured that a stable condition is provided for turning on or/and turning off a CPU, thereby saving electrical energy consumption of a CPU.

BRIEF DESCRIPTION OF DRAWINGS

To illustrate the technical solutions in the embodiments of the present invention or in the prior art more clearly, accompanying drawings required for describing the embodiments or the prior art are introduced briefly in the following.

DESCRIPTION OF EMBODIMENTS

In order to make the objectives, technical solutions, and advantages of the present invention more comprehensible, the embodiments of the present invention are described in further detail in the following with reference to the accompanying drawings.

Figure 1:
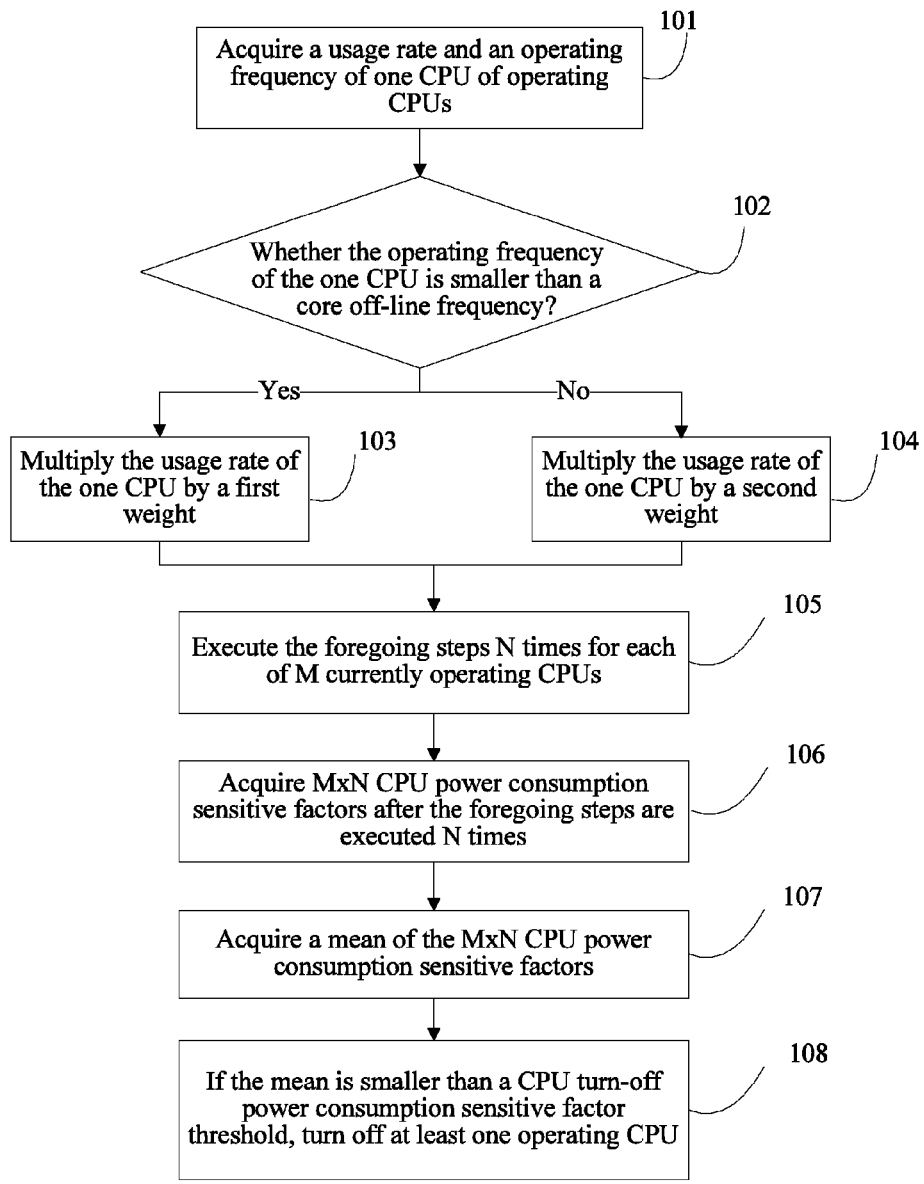
FIG. 1 is a first flow chart of a method for controlling a CPU according to a first embodiment of the present invention.

A first embodiment of the present invention provides a method for controlling a CPU, which, as shown in FIG. 1, includes the following steps:

Step 101: Acquire a usage rate and an operating frequency of one CPU of operating CPUs. The number of the operating CPUs is M, and M is a positive integer greater than or equal to two. A usage rate and an operating frequency of a CPU may be obtained through detection. A usage rate of a CPU refers to a relative percentage of a CPU resource occupied by a program running in a system.

Step 102: Determine whether the operating frequency of the one CPU is smaller than a core off-line frequency. If the operating frequency of the one CPU is smaller than the core off-line frequency, proceed to step 103, otherwise proceed to step 104. The core off-line frequency may be 486 megahertz (MHz).

Step 103: If the operating frequency of the one CPU is smaller than the core off-line frequency, multiply the usage rate of the one CPU by a first weight to obtain a CPU power consumption sensitive factor corresponding to the one CPU. The first weight may be a low weight, a value of which may be 1. The CPU power consumption sensitive factor is a sensitivity degree of a CPU to power consumed by the CPU, a value of which is a product of multiplying a current CPU operating frequency by a CPU frequency weight.

Step 104: If the operating frequency of the one CPU is greater than or equal to the core off-line frequency, multiply the usage rate of the one CPU by a second weight to obtain a CPU power consumption sensitive factor corresponding to the one CPU. The second weight may be a medial weight, a value of which is greater than that of the low weight, for example, may be 2. The first weight and the second weight are not equal and are both positive integers greater than or equal to one.

Step 105: Execute the foregoing steps N times for each of M operating CPUs, where N is a positive integer greater than or equal to one. Usually, a value of N may be 5.

Step 106: Acquire M×N CPU power consumption sensitive factors after the foregoing steps are executed N times.

Step 107: Acquire a mean of the M×N CPU power consumption sensitive factors. The mean may include the following several types: an arithmetic mean, a geometric mean, a harmonic mean, a root mean square, a moving mean, an arithmetic-geometric mean and an arithmetic-root mean square. Manners for calculating the foregoing various types of means are well known by a person skilled in the art, and are not described in detail here.

Step 108: Turn off at least one operating CPU if the mean is smaller than a CPU turn-off power consumption sensitive factor threshold. A policy for turning off a CPU may be to turn off a CPU that is turned on last, or to turn off a CPU that is turned on first. Alternatively, a CPU with a lowest usage rate may be turned off according to a usage rate of each operating CPU. Alternatively, a CPU with a lowest operating frequency is turned off according to an operating frequency of each operating CPU. In addition, a CPU may also be turned off according to other policies, which are not limited here. For turning off a CPU involved in the following, reference may be made to the turn-off policy here for operations.

In the method for controlling a CPU provided in the first embodiment of the present invention, a concept of a first weight and a second weight is introduced. A usage rate of a CPU is multiplied to obtain a CPU power consumption sensitive factor, and a mean of CPU power consumption sensitive factors is calculated, and is compared with a CPU power consumption sensitive factor threshold. At least one operating CPU is turned off if the mean is smaller than a CPU turn-off power consumption sensitive factor threshold. By using weights and a mean, it is ensured that a stable condition is provided for turning off a CPU, thereby saving electrical energy consumption of a CPU.

Figure 2:
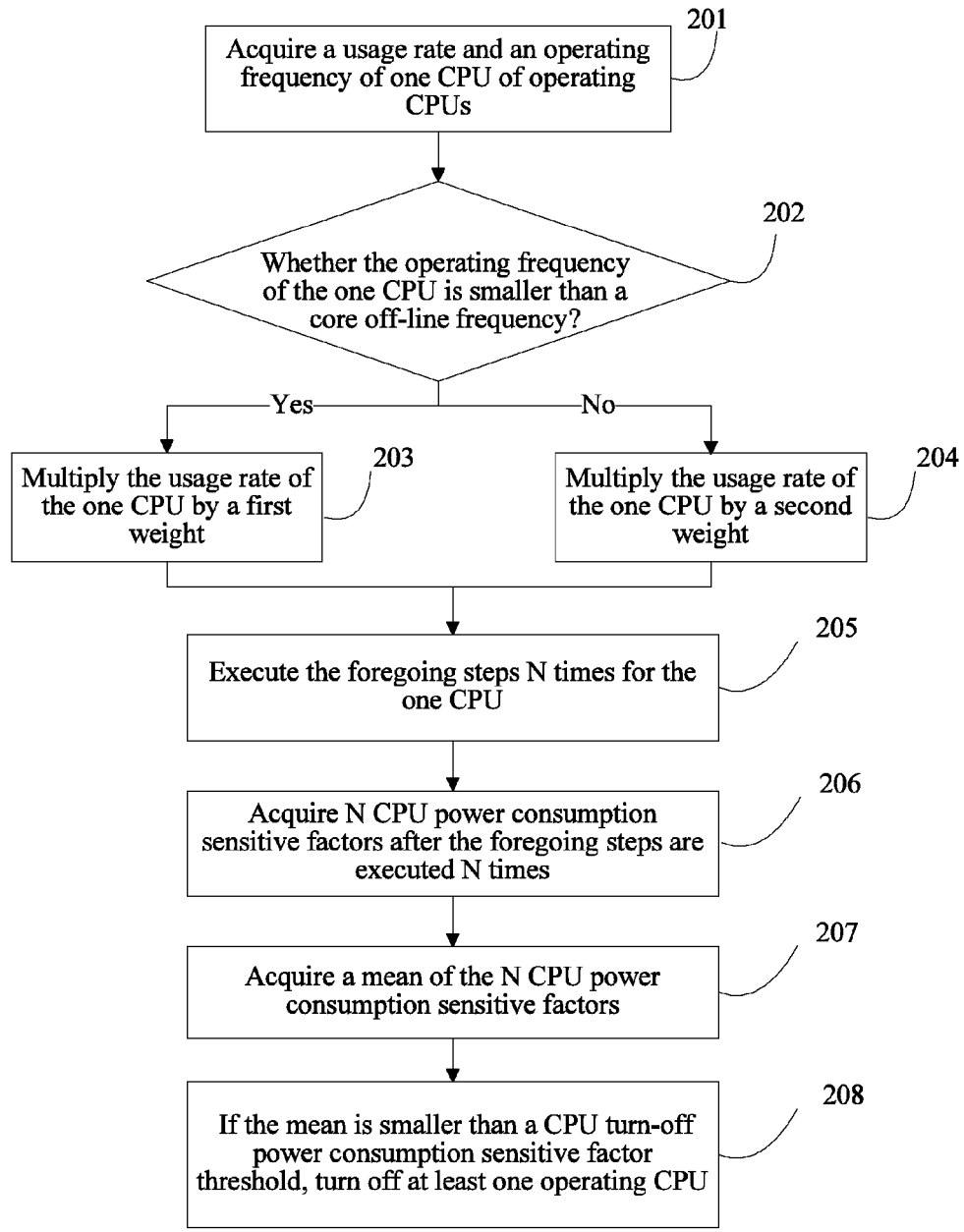
FIG. 2 is a second flow chart of a method for controlling a CPU according to a second embodiment of the present invention.

A second embodiment of the present invention provides a method for controlling a CPU, which, as shown in FIG. 2, includes the following steps:

Step 201: Acquire a usage rate and an operating frequency of one CPU of operating CPUs, where the number of the operating CPUs is M, and M is a positive integer greater than or equal to two.

Step 202: Determine whether the operating frequency of the one CPU is smaller than a core off-line frequency. If the operating frequency of the one CPU is smaller than the core off-line frequency, proceed to step 203. If the operating frequency of the one CPU is greater than or equal to the core off-line frequency, proceed to step 204.

Step 203: If the operating frequency of the one CPU is smaller than the core off-line frequency, multiply the usage rate of the one CPU by a first weight to obtain a CPU power consumption sensitive factor corresponding to the one CPU. The first weight may be a low weight, a value of which may be 1.

Step 204: If the operating frequency of the one CPU is greater than or equal to the core off-line frequency, multiply the usage rate of the one CPU by a second weight to obtain a CPU power consumption sensitive factor corresponding to the one CPU. The second weight may be a medial weight, a value of which is greater than that of the low weight, for example, may be 2. The first weight and the second weight are not equal and are both positive integers greater than or equal to one.

Step 205: Execute the foregoing steps N times for the one CPU, where N is a positive integer greater than or equal to one.

Step 206: Acquire N CPU power consumption sensitive factors after the foregoing steps are executed N times.

Step 207: Acquire a mean of the N CPU power consumption sensitive factors.

Step 208: Turn off at least one operating CPU if the mean is smaller than a CPU turn-off power consumption sensitive factor threshold.

The method for controlling a CPU provided in the second embodiment of the present invention is different from the first embodiment in that CPU power consumption sensitive factors of N times are calculated only through one CPU, and a mean of the CPU power consumption sensitive factors of N times is calculated, and is compared with a CPU turn-off power consumption sensitive factor threshold, so as to determine that at least one operating CPU is in a non-operating state. Compared with the method in the first embodiment, implementation of the second embodiment requires fewer CPUs, and therefore, an entire algorithm is simpler and more effective.

Figure 3:
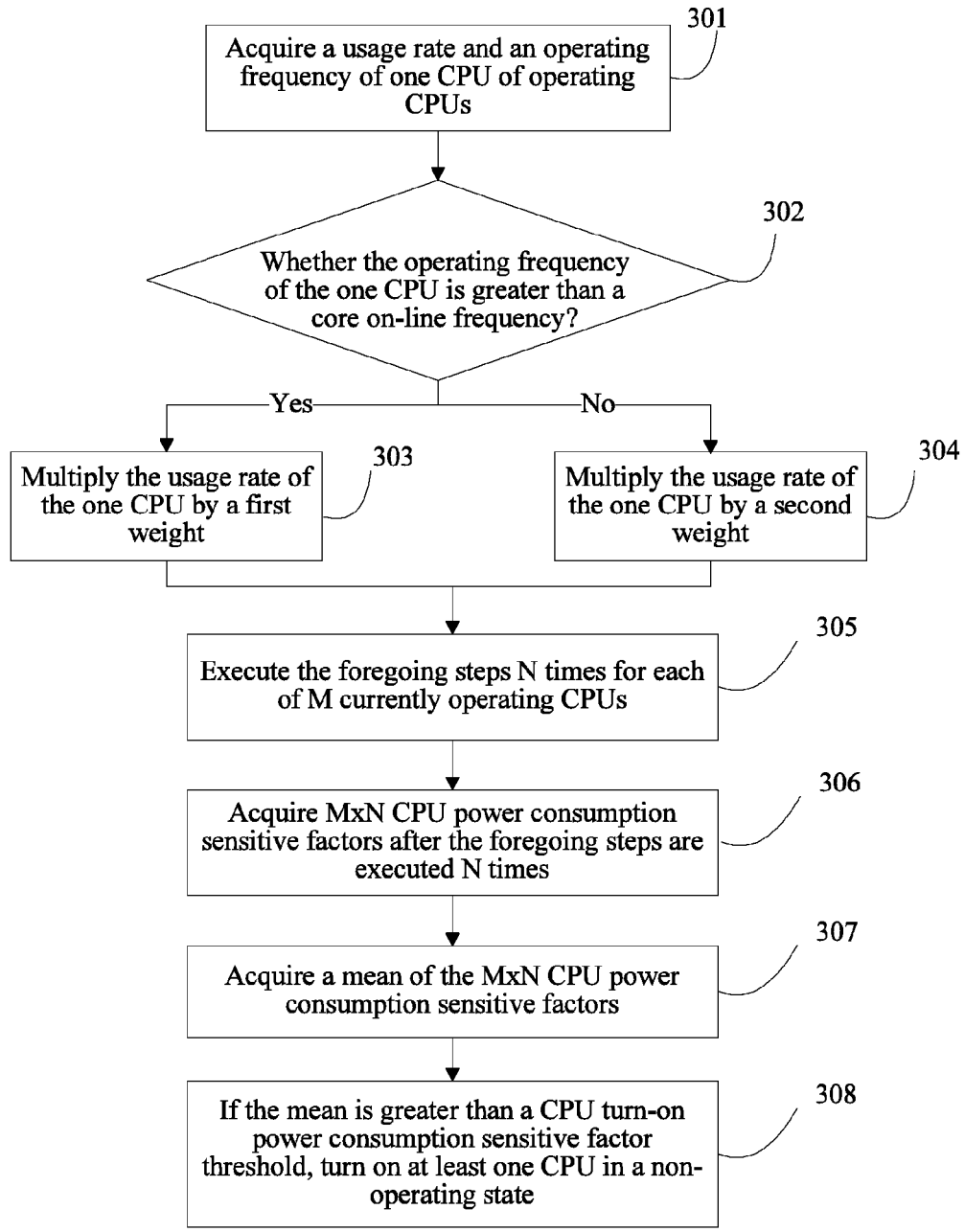
FIG. 3 is a third flow chart of a method for controlling a CPU according to a third embodiment of the present invention.

A third embodiment of the present invention provides a method for controlling a CPU, which, as shown in FIG. 3, includes the following steps:

Step 301: Acquire a usage rate and an operating frequency of one CPU of operating CPUs, where the number of the operating CPUs is M, M is a positive integer greater than or equal to one. Currently, the number of CPUs in a non-operating state is greater than or equal to one.

Step 302: Determine whether the operating frequency of the one CPU is greater than a core on-line frequency. The core on-line frequency may be 918 MHz.

Step 303: If the operating frequency of the one CPU is greater than the core on-line frequency, multiply the usage rate of the one CPU by a first weight to obtain a CPU power consumption sensitive factor corresponding to the one CPU. The first weight is a high weight, a value of which may be 4.

Step 304: If the operating frequency of the one CPU is smaller than or equal to the core on-line frequency, multiply the usage rate of the one CPU by a second weight to obtain a CPU power consumption sensitive factor corresponding to the one CPU. The second weight may be a medial weight, a value of which is smaller than that of the high weight, for example, may be 2. The first weight and the second weight are not equal and are both positive integers greater than or equal to one.

Step 305: Execute the foregoing steps N times for each of M operating CPUs, where N is a positive integer greater than or equal to one. Usually, a value of N may be 10.

Step 306: Acquire M×N CPU power consumption sensitive factors after the foregoing steps are executed N times.

Step 307: Acquire a mean of the M×N CPU power consumption sensitive factors.

Step 308: Turn on at least one CPU in a non-operating state if the mean is greater than a CPU turn-on power consumption sensitive factor threshold. The CPU turn-on power consumption sensitive factor threshold may be set to 200. A policy for turning on a CPU may be to turn on a CPU successively in ascending order according to sequence numbers of CPUs in a non-operating state, or to turn on a CPU successively in descending order according to sequence numbers of CPUs in a non-operating state. A CPU may also be turned off according to other policies, which are not limited here. For turning on of a CPU involved in the following, reference may be made to the turn-on policy here for operations.

In the method for controlling a CPU provided in the third embodiment of the present invention, a concept of a first weight and a second weight is introduced. A usage rate of a CPU is multiplied to obtain a CPU power consumption sensitive factor, and a mean of CPU power consumption sensitive factors is calculated, and is compared with a CPU power consumption sensitive factor threshold. At least one CPU in a non-operating state is turned on if the mean is greater than a CPU turn-on power consumption sensitive factor threshold. By using weights and a mean, it is ensured that a stable condition is provided for turning on a CPU, thereby saving electrical energy consumption of a CPU.

Figure 4:
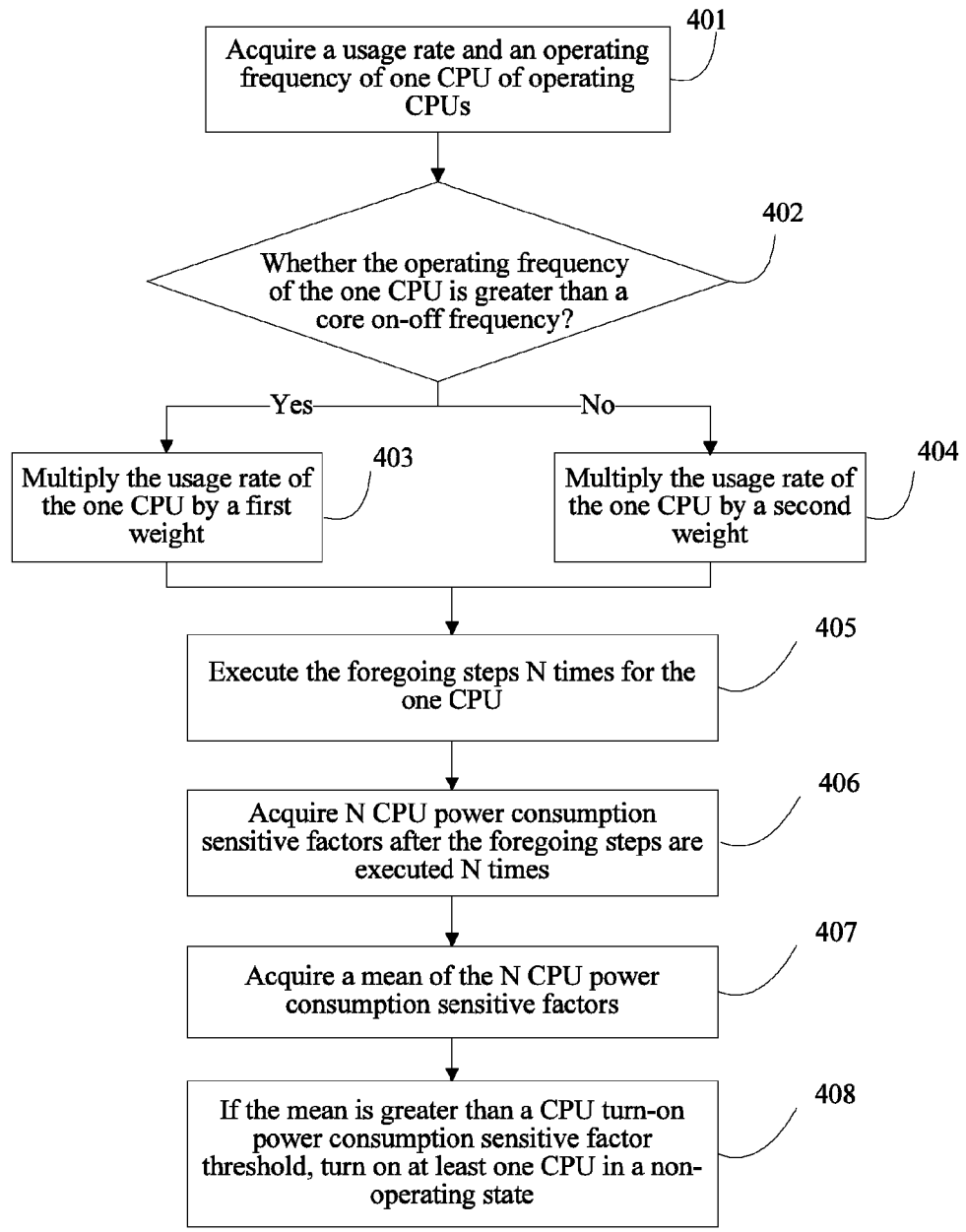
FIG. 4 is a fourth flow chart of a method for controlling a CPU according to a fourth embodiment of the present invention.

A fourth embodiment of the present invention provides a method for controlling a CPU, which, as shown in FIG. 4, includes the following steps:

Step 401: Acquire a usage rate and an operating frequency of one CPU of operating CPUs, where the number of the operating CPUs is M, M is a positive integer greater than or equal to one. Currently, the number of CPUs in a non-operating state is greater than or equal to one.

Step 402: Determine whether the operating frequency of the one CPU is greater than a core on-line frequency.

Step 403: If the operating frequency of the one CPU is greater than the core on-line frequency, multiply the usage rate of the one CPU by a first weight to obtain a CPU power consumption sensitive factor corresponding to the one CPU. The first weight is a high weight, a value of which may be 4.

Step 404: If the operating frequency of the one CPU is smaller than or equal to the core on-line frequency, multiply the usage rate of the one CPU by a second weight to obtain a CPU power consumption sensitive factor corresponding to the one CPU. The first weight is a medial weight, a value of which is smaller than that of the high weight, for example, may be 2. The first weight and the second weight are not equal and are both positive integers greater than or equal to one.

Step 405: Execute the foregoing steps N times for the one CPU, where N is a positive integer greater than or equal to one.

Step 406: Acquire N CPU power consumption sensitive factors after the foregoing steps are executed N times.

Step 407: Acquire a mean of the N CPU power consumption sensitive factors.

Step 408: Turn on at least one CPU in a non-operating state if the mean is greater than a CPU turn-on power consumption sensitive factor threshold.

The method for controlling a CPU provided in the fourth embodiment of the present invention is different from the third embodiment in that CPU power consumption sensitive factors of N times are calculated only through one CPU, and a mean of the CPU power consumption sensitive factors of N times is calculated, and is compared with a CPU turn-on power consumption sensitive factor threshold, so as to determine that at least one CPU that is currently in a non-operating state is in an operating state. Compared with the method in the third embodiment, implementation of the fourth embodiment requires fewer CPUs, and therefore, an entire algorithm is simpler and more effective.

A fifth embodiment of the present invention provides a method for controlling a CPU. On the basis of the first embodiment, there are the following changes in this embodiment:

Step 105 of executing the foregoing steps N times for each of M operating CPUs may specifically include: executing the foregoing steps N times for an $n^{th}$ operating CPU, where n is greater than or equal to one and is smaller than or equal to M.

Further, the executing the foregoing steps N times for an $n^{th}$ operating CPU may include: when a timing moment of a timer n corresponding to the $n^{th}$ operating CPU arrives, executing the foregoing steps 101 to 104; therefore, when the timing moment of the timer n arrives N times consecutively, the foregoing steps 101 to 104 are executed N times in total.

In addition, the method in this embodiment may further include when a system is idle, stopping, by the timer n corresponding to the $n^{th}$ operating CPU, timing.

In addition, the method in this embodiment may further include when the system is not idle, starting, by the timer n, timing. Whether the system is idle is notified by an operating system of a device where a scheduling CPU that executes the method in this embodiment is located to the CPU responsible for scheduling.

Further, step 108 of turning off at least one operating CPU if the mean is smaller than a CPU turn-off power consumption sensitive factor threshold may include if the mean is smaller than the CPU turn-off power consumption sensitive factor threshold, and the number of queue tasks running on the operating CPUs is smaller than M, turning off at least one operating CPU. A queue task running on a CPU is a running thread.

In this embodiment, a timer is adopted to control a moment of executing a method step, and a timer is turned on or turned off based on whether a system is idle. Therefore, when a system is idle, a timer may be turned off in time, to save power consumption. In addition, when the system is not idle, a timer can be turned on for timing in time, to rapidly respond to various types of demands. Additionally, by comparing the number of queue tasks running on a CPU and the number of operating CPUs, when a system load is unbalanced, the power consumption may still be saved. For example, when there is only one task that cannot be separated to run on two or more CPUs running in a system (for example, one thread task, or one single-thread process task), and a system load occupied by the task is higher than a system load busy threshold, the number of running CPU cores is not increased. In this way, occurrence of the following case is avoided: The number of CPU cores is increased individually, but because the system is running on a single process in this case, scheduling on different CPUs cannot be performed at the same time, which results in an ineffective power consumption overhead of a newly added CPU.

A sixth embodiment of the present invention provides a method for controlling a CPU. On the basis of the second embodiment, there are the following changes in this embodiment:

Step 205 of executing the foregoing steps N times for the one CPU may specifically include: when a timing moment of a timer a corresponding to the one CPU arrives, executing the foregoing steps 201 to 204; therefore, when the timing moment of the timer a arrives N times consecutively, the foregoing steps 201 to 204 are executed N times in total.

In addition, the method in this embodiment may further include when a system is idle, stopping, by the timer a, timing.

In addition, the method in this embodiment may further include when the system is not idle, starting, by the timer a, timing. Whether the system is idle is notified by an operating system of a device where a scheduling CPU that executes the method in this embodiment is located to the CPU responsible for scheduling.

Further, step 208 of turning off at least one operating CPU if the mean is smaller than a CPU turn-off power consumption sensitive factor threshold may include if the mean is smaller than the CPU turn-off power consumption sensitive factor threshold, and the number of queue tasks running on the operating CPUs is smaller than M, turning off at least one operating CPU.

In this embodiment, a timer is adopted to control a moment of executing a method step, and a timer is turned on or turned off based on whether a system is idle. Therefore, when a system is idle, a timer may be turned off in time, to save power consumption. In addition, when the system is not idle, a timer can be turned on for timing in time, to rapidly respond to various types of demands. Additionally, by comparing the number of queue tasks running on a CPU and the number of operating CPUs, when a system load is unbalanced, the power consumption may still be saved. For example, when there is only one task that cannot be separated to run on two or more CPUs running in a system (for example, one thread task, or one single-thread process task), and a system load occupied by the task is higher than a system load busy threshold, the number of running CPU cores is not increased. In this way, occurrence of the following case is avoided: The number of CPU cores is increased individually, but because the system is running on a single process in this case, scheduling on different CPUs cannot be performed at the same time, which results in an ineffective power consumption overhead of a newly added CPU.

A seventh embodiment of the present invention provides a method for controlling a CPU. On the basis of the third embodiment, there are the following changes in this embodiment:

Step 305 of executing the foregoing steps N times for each of M operating CPUs may specifically include: executing the foregoing steps N times for an $n^{th}$ operating CPU, where n is greater than or equal to one and is smaller than or equal to M.

Further, the executing the foregoing steps N times for an $n^{th}$ operating CPU may include: when a timing moment of a timer n corresponding to the $n^{th}$ operating CPU arrives, executing the foregoing steps 301 to 304; therefore, when the timing moment of the timer n arrives N times consecutively, the foregoing steps 301 to 304 are executed N times in total.

In addition, the method in this embodiment may further include when a system is idle, stopping, by the timer n, timing.

In addition, the method in this embodiment may further include when the system is not idle, starting, by the timer n, timing. Whether the system is idle is notified by an operating system of a device where a scheduling CPU that executes the method in this embodiment is located to the CPU responsible for scheduling.

In addition, the method in this embodiment may further include: if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, stopping, by the timer, timing.

The maximum frequency lasting period time threshold is (the CPU turn-on power consumption sensitive factor threshold×N)/(a usage rate threshold×a frequency weight), where the frequency weight is the first weight, that is, the high weight, the value of which may be 4. The usage rate threshold may be a different value according to a different platform; preferably, a value range of this value may be between 90% and 95%. The different platform here refers to a different hardware chipset.

That the number of times that the operating frequencies are all maximum frequency values is just greater than a maximum frequency lasting period time threshold is the number of times that the operating frequencies are all maximum frequency values is the maximum frequency lasting period time threshold plus one.

Further, step 308 of turning on at least one CPU in a non-operating state if the mean is greater than a CPU turn-on power consumption sensitive factor threshold may include: if the mean is greater than the CPU turn-on power consumption sensitive factor threshold, and the number of queue tasks running on the operating CPUs is greater than M, turning on at least one CPU in a non-operating state.

In this embodiment, a timer is adopted to control a moment of executing a method step, and a timer is turned on or turned off based on whether a system is idle. Therefore, when a system is idle, a timer may be turned off in time, to save power consumption. In addition, when the system is not idle, a timer can be turned on for timing in time, to rapidly respond to various types of demands. In another manner, a timer is controlled to stop if when a timing moment of the timer arrives consecutively, operating frequencies of a CPU are all maximum values, and the number of times that the operating frequencies of the CPU are maximum values is just greater than a maximum frequency lasting period time threshold. This case indicates that the CPU has run at a full load for a period of time and has reached a stable state. In this case, it is unnecessary to keep the timer on, so the timer may be turned off to save electrical power. Additionally, by comparing the number of queue tasks running on a CPU and the number of operating CPUs, when the number of system tasks is greater than the number of operating CPUs, one CPU in a non-operating state is turned on, so as to rapidly respond to a user's demand and improve user experience.

An eighth embodiment of the present invention provides a method for controlling a CPU. On the basis of the fourth embodiment, there are the following changes in this embodiment:

Step 405 of executing the foregoing steps N times for the one CPU may specifically include: when a timing moment of a timer a corresponding to the one CPU arrives, executing the foregoing steps 401 to 404; therefore, when the timing moment of the timer a arrives N times consecutively, the foregoing steps 401 to 404 are executed N times in total.

In addition, the method in this embodiment may further include when a system is idle, stopping, by the timer a, timing.

In addition, the method in this embodiment may further include when the system is not idle, starting, by the timer a, timing. Whether the system is idle is notified by an operating system of a device where a scheduling CPU that executes the method in this embodiment is located to the CPU responsible for scheduling.

In addition, the method in this embodiment may further include: if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, stopping, by the timer, timing.

The maximum frequency lasting period time threshold is (the CPU turn-on power consumption sensitive factor threshold×N)/(a usage rate threshold×a frequency weight), where the frequency weight is the first weight, that is, the high weight, the value of which may be 4.

That the number of times that the operating frequencies are all maximum frequency values is just greater than a maximum frequency lasting period time threshold is the number of times that the operating frequencies are all maximum frequency values is the maximum frequency lasting period time threshold plus one.

Further, step 408 of turning on at least one CPU in a non-operating state if the mean is greater than a CPU turn-on power consumption sensitive factor threshold may include if the mean is greater than the CPU turn-on power consumption sensitive factor threshold, and the number of queue tasks running on the operating CPUs is greater than M, turning on at least one CPU in a non-operating state.

In this embodiment, a timer is adopted to control a moment of executing a method step, and a timer is turned on or turned off based on whether a system is idle. Therefore, when a system is idle, a timer may be turned off in time, so as to save power consumption. In addition, when the system is not idle, a timer can be turned on for timing in time, so as to rapidly respond to various types of demands. In another manner, a timer is controlled to stop if when a timing moment of the timer arrives consecutively, operating frequencies of a CPU are all maximum values, and the number of times that the operating frequencies of the CPU are maximum values is just greater than a maximum frequency lasting period time threshold. This case indicates that the CPU has run at a full load for a period of time and has reached a stable state. In this case, it is unnecessary to keep the timer on, so the timer may be turned off to save electrical power. Additionally, by comparing the number of queue tasks running on a CPU and the number of operating CPUs, when the number of system tasks is greater than the number of operating CPUs, one CPU in a non-operating state is turned on, so as to rapidly respond to a user's demand and improve user experience.

A CPU that executes the foregoing method embodiment may specifically be a CPU responsible for scheduling. That is, the CPU that executes the foregoing method embodiment may schedule other ordinary CPUs that execute instructions and computation. The CPU responsible for scheduling may be an independent CPU except for the other ordinary CPUs that execute instructions and computation, and a scheduling function may also be integrated in a certain ordinary CPU that executes instructions and computation. A hardware form of the CPU responsible for scheduling (hereinafter referred to as "scheduling CPU") may be an advanced reduced instruction set computing machine (Advanced Reduced Instruction Set Computing (RISC) Machines (ARM)) chip, and may also be other chips such as a single-chip microcomputer.

Figure 5:
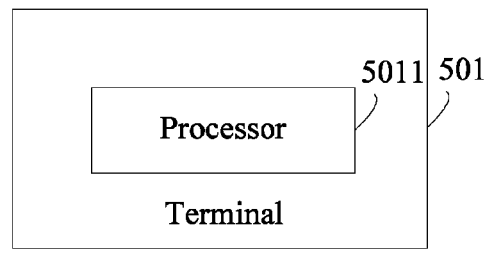
FIG. 5 is a schematic structural diagram of a terminal according to a ninth embodiment of the present invention.

A ninth embodiment of the present invention further provides a terminal. As shown in FIG. 5, a terminal 501 includes a processor 5011. The processor may specifically be a CPU, and the CPU may further be a scheduling CPU. The processor 5011 is configured to: acquire a usage rate and an operating frequency of one CPU of operating CPUs, where the number of the operating CPUs is M, and M is a positive integer greater than or equal to two, a usage rate and an operating frequency of a CPU may be obtained through detection, and a usage rate of a CPU refers to a relative percentage of a CPU resource occupied by a program running in a system; determine whether the operating frequency of the one CPU is smaller than a core off-line frequency, if the operating frequency of the one CPU is smaller than the core off-line frequency, proceed to step 103, otherwise proceed to step 104, where the core off-line frequency may be 486 MHz; if the operating frequency of the one CPU is smaller than the core off-line frequency, multiply the usage rate of the one CPU by a first weight to obtain a CPU power consumption sensitive factor corresponding to the one CPU, where the first weight may be a low weight, a value of which may be 1, the CPU power consumption sensitive factor is a sensitivity degree of a CPU to power consumed by the CPU, a value of which is a product of multiplying a current CPU operating frequency by a CPU frequency weight; if the operating frequency of the one CPU is greater than or equal to the core off-line frequency, multiply the usage rate of the one CPU by a second weight to obtain a CPU power consumption sensitive factor corresponding to the one CPU, where the second weight may be a medial weight, a value of which is greater than that of the low weight, for example, may be 2, and the first weight and the second weight are not equal and are both positive integers greater than or equal to one; execute the foregoing steps N times for each of M operating CPUs, where N is a positive integer greater than or equal to one, and usually, a value of N may be 5; acquire M×N CPU power consumption sensitive factors after the foregoing steps are executed N times; acquire a mean of the M×N CPU power consumption sensitive factors, where the mean may include the following several types: an arithmetic mean, a geometric mean, a harmonic mean, a root mean square, a moving mean, an arithmetic-geometric mean and an arithmetic-root mean square, and manners for calculating the foregoing various types of means are well known by a person skilled in the art, and are not described in detail here; and turn off at least one operating CPU if the mean is smaller than a CPU turn-off power consumption sensitive factor threshold, where a policy for turning off a CPU may be to turn off a CPU that is turned on last, or to turn off a CPU that is turned on first; alternatively, a CPU with a lowest usage rate may be turned off according to a usage rate of each operating CPU, or a CPU with a lowest operating frequency is turned off according to an operating frequency of each operating CPU; in addition, a CPU may also be turned off according to other policies, which are not limited here, and for turning off of a CPU involved in the following, reference may be made to the turn-off policy here for operations.

In the terminal provided in the ninth embodiment of the present invention, a concept of a first weight and a second weight is introduced. A usage rate of a CPU is multiplied to obtain a CPU power consumption sensitive factor, and a mean of CPU power consumption sensitive factors is calculated, and is compared with a CPU power consumption sensitive factor threshold. At least one operating CPU is turned off if the mean is smaller than a CPU turn-off power consumption sensitive factor threshold. By using weights and a mean, it is ensured that a stable condition is provided for turning off a CPU, thereby saving electrical energy consumption of a CPU.

A tenth embodiment of the present invention further provides a terminal. As shown in FIG. 5, a terminal 501 includes a processor 5011. The processor may specifically be a CPU, and the CPU may further be a scheduling CPU. The processor 5011 is configured to: acquire a usage rate and an operating frequency of one CPU of operating CPUs, where the number of the operating CPUs is M, and M is a positive integer greater than or equal to two; determine whether the operating frequency of the one CPU is smaller than a core off-line frequency, if the operating frequency of the one CPU is smaller than the core off-line frequency, proceed to step 203, and if the operating frequency of the one CPU is greater than or equal to the core off-line frequency, proceed to step 204; if the operating frequency of the one CPU is smaller than the core off-line frequency, multiply the usage rate of the one CPU by a first weight to obtain a CPU power consumption sensitive factor corresponding to the one CPU, where the first weight may be a low weight, a value of which may be 1; if the operating frequency of the one CPU is greater than or equal to the core off-line frequency, multiply the usage rate of the one CPU by a second weight to obtain a CPU power consumption sensitive factor corresponding to the one CPU, where the second weight may be a medial weight, a value of which is greater than that of the low weight, for example, may be 2, and the first weight and the second weight are not equal and are both positive integers greater than or equal to one; execute the foregoing steps N times for the one CPU, where N is a positive integer greater than or equal to one; acquire N CPU power consumption sensitive factors after the foregoing steps are executed N times; acquire a mean of the N CPU power consumption sensitive factors; and turn off at least one operating CPU if the mean is smaller than a CPU turn-off power consumption sensitive factor threshold.

The terminal provided in the tenth embodiment of the present invention is different from the ninth embodiment in that CPU power consumption sensitive factors of N times are calculated only through one CPU, and a mean of the CPU power consumption sensitive factors of N times is calculated, and is compared with a CPU turn-off power consumption sensitive factor threshold, so as to determine that at least one operating CPU is in a non-operating state. Compared with the method in the ninth embodiment, implementation of the tenth embodiment requires fewer CPUs, and therefore, an entire algorithm is simpler and more effective.

An eleventh embodiment of the present invention further provides a terminal. As shown in FIG. 5, a terminal 501 includes a processor 5011. The processor may specifically be a CPU, and the CPU may further be a scheduling CPU. The processor 5011 is configured to: acquire a usage rate and an operating frequency of one CPU of operating CPUs, where the number of the operating CPUs is M, M is a positive integer greater than or equal to one, and currently the number of CPUs in a non-operating state is greater than or equal to one; determine whether the operating frequency of the one CPU is greater than a core on-line frequency, where the core on-line frequency may be 918 MHz; if the operating frequency of the one CPU is greater than the core on-line frequency, multiply the usage rate of the one CPU by a first weight to obtain a CPU power consumption sensitive factor corresponding to the one CPU, where the first weight is a high weight, a value of which may be 4; if the operating frequency of the one CPU is smaller than or equal to the core on-line frequency, multiply the usage rate of the one CPU by a second weight to obtain a CPU power consumption sensitive factor corresponding to the one CPU, where the second weight may be a medial weight, a value of which is smaller than that of the high weight, for example, may be 2, and the first weight and the second weight are not equal and are both positive integers greater than or equal to one; execute the foregoing steps N times for each of M operating CPUs, where N is a positive integer greater than or equal to one, and usually, a value of N may be 10; acquire M×N CPU power consumption sensitive factors after the foregoing steps are executed N times; acquire a mean of the M×N CPU power consumption sensitive factors; and turn on at least one CPU in a non-operating state if the mean is greater than a CPU turn-on power consumption sensitive factor threshold, where the CPU turn-on power consumption sensitive factor threshold may be set to 200, a policy for turning on a CPU may be to turn on a CPU successively in ascending order according to sequence numbers of CPUs in a non-operating state, or to turn on a CPU successively in descending order according to sequence numbers of CPUs in a non-operating state, a CPU may also be turned off according to other policies, which are not limited here, and for turning on of a CPU involved in the following, reference may be made to the turn-on policy here for operations.

In the terminal provided in the eleventh embodiment of the present invention, a concept of a first weight and a second weight is introduced. A usage rate of a CPU is multiplied to obtain a CPU power consumption sensitive factor, and a mean of CPU power consumption sensitive factors is calculated, and is compared with a CPU power consumption sensitive factor threshold. At least one CPU in a non-operating state is turned on if the mean is greater than a CPU turn-on power consumption sensitive factor threshold. By using weights and a mean, it is ensured that a stable condition is provided for turning on a CPU, thereby saving electrical energy consumption of a CPU.

A twelfth embodiment of the present invention further provides a terminal. As shown in FIG. 5, a terminal 501 includes a processor 5011. The processor may specifically be a CPU, and the CPU may further be a scheduling CPU. The processor 5011 is configured to: acquire a usage rate and an operating frequency of one CPU of operating CPUs, where the number of the operating CPUs is M, M is a positive integer greater than or equal to one, and currently the number of CPUs in a non-operating state is greater than or equal to one; determine whether the operating frequency of the one CPU is greater than a core on-line frequency; if the operating frequency of the one CPU is greater than the core on-line frequency, multiply the usage rate of the one CPU by a first weight to obtain a CPU power consumption sensitive factor corresponding to the one CPU, where the first weight is a high weight, a value of which may be 4; if the operating frequency of the one CPU is smaller than or equal to the core on-line frequency, multiply the usage rate of the one CPU by a second weight to obtain a CPU power consumption sensitive factor corresponding to the one CPU, where the first weight is a medial weight, a value of which is smaller than that of the high weight, for example, may be 2, and the first weight and the second weight are not equal and are both positive integers greater than or equal to one; execute the foregoing steps N times for the one CPU, where N is a positive integer greater than or equal to one; acquire N CPU power consumption sensitive factors after the foregoing steps are executed N times; acquire a mean of the N CPU power consumption sensitive factors; and turn on at least one CPU in a non-operating state if the mean is greater than a CPU turn-on power consumption sensitive factor threshold.

The terminal provided in the twelfth embodiment of the present invention is different from the eleventh embodiment in that CPU power consumption sensitive factors of N times are calculated only through one CPU, and a mean of the CPU power consumption sensitive factors of N times is calculated, and is compared with a CPU turn-on power consumption sensitive factor threshold, so as to determine that at least one CPU that is currently in a non-operating state is in an operating state. Compared with the method in the eleventh embodiment, implementation of the twelfth embodiment requires fewer CPUs, and therefore, an entire algorithm is simpler and more effective.

A thirteenth embodiment of the present invention provides a terminal. On the basis of the ninth embodiment, there are the following changes in this embodiment:

That the processor 5011 executes the foregoing steps N times for each of M operating CPUs may specifically include executing the foregoing steps N times for an $n^{th}$ operating CPU, where n is greater than or equal to one and is smaller than or equal to M.

Further, the executing the foregoing steps N times for an $n^{th}$ operating CPU may include when a timing moment of a timer n corresponding to the $n^{th}$ operating CPU arrives, executing first four functions of the processor 5011. Therefore, when the timing moment of the timer n arrives N times consecutively, the first four functions of the foregoing processor 5011 are executed N times in total.

In addition, the processor provided in this embodiment may be further configured to when a system is idle, control the timer n corresponding to the $n^{th}$ operating CPU to stop timing.

In addition, the processor provided in this embodiment may be further configured to when the system is not idle, control the timer n to start timing. Whether the system is idle is notified by an operating system of a device where a scheduling CPU that executes the method in this embodiment is located to the CPU responsible for scheduling.

Further, that the processor turns off at least one operating CPU when the mean is smaller than a CPU turn-off power consumption sensitive factor threshold may include if the mean is smaller than the CPU turn-off power consumption sensitive factor threshold, and the number of queue tasks running on the operating CPUs is smaller than M, turning off at least one operating CPU. A queue task running on a CPU is a running thread.

In this embodiment, a timer is adopted to control a moment of executing a method step, and a timer is turned on or turned off based on whether a system is idle. Therefore, when a system is idle, a timer may be turned off in time, so as to save power consumption. In addition, when the system is not idle, a timer can be turned on for timing in time, so as to rapidly respond to various types of demands. Additionally, by comparing the number of queue tasks running on a CPU and the number of operating CPUs, when a system load is unbalanced, the power consumption may still be saved. For example, when there is only one task that cannot be separated to run on two or more CPUs running in a system (for example, one thread task, or one single-thread process task), and a system load occupied by the task is higher than a system load busy threshold, the number of running CPU cores is not increased. In this way, occurrence of the following case is avoided: The number of CPU cores is increased individually, but because the system is running on a single process in this case, scheduling on different CPUs cannot be performed at the same time, which results in an ineffective power consumption overhead of a newly added CPU.

A fourteenth embodiment of the present invention provides a terminal. On the basis of the tenth embodiment, there are the following changes in this embodiment:

That the processor 5011 executes the foregoing steps N times for the one CPU may specifically include when a timing moment of a timer a corresponding to the one CPU arrives, executing first four functions of the processor 5011. Therefore, when the timing moment of the timer a arrives N times consecutively, the first four functions of the processor 5011 are executed N times in total.

In addition, the processor provided in this embodiment may be further configured to when a system is idle, control the timer a to stop timing.

In addition, the processor provided in this embodiment may be further configured to when the system is not idle, control the timer a to start timing. Whether the system is idle is notified by an operating system of a device where a scheduling CPU that executes the method in this embodiment is located to the CPU responsible for scheduling.

Further, that the processor 5011 turns off at least one operating CPU when the mean is smaller than a CPU turn-off power consumption sensitive factor threshold may include if the mean is smaller than the CPU turn-off power consumption sensitive factor threshold, and the number of queue tasks running on the operating CPUs is smaller than M, turning off at least one operating CPU.

In this embodiment, a timer is adopted to control a moment of executing a method step, and a timer is turned on or turned off based on whether a system is idle. Therefore, when a system is idle, a timer may be turned off in time, so as to save power consumption. In addition, when the system is not idle, a timer can be turned on for timing in time, so as to rapidly respond to various types of demands. Additionally, by comparing the number of queue tasks running on a CPU and the number of operating CPUs, when a system load is unbalanced, the power consumption may still be saved. For example, when there is only one task that cannot be separated to run on two or more CPUs running in a system (for example, one thread task, or one single-thread process task), and a system load occupied by the task is higher than a system load busy threshold, the number of running CPU cores is not increased. In this way, occurrence of the following case is avoided: The number of CPU cores is increased individually, but because the system is running on a single process in this case, scheduling on different CPUs cannot be performed at the same time, which results in an ineffective power consumption overhead of a newly added CPU.

A fifteenth embodiment of the present invention provides a terminal. On the basis of the eleventh embodiment, there are the following changes in this embodiment:

That the processor 5011 executes the foregoing steps N times for each of M operating CPUs may specifically include executing the foregoing steps N times for an $n^{th}$ operating CPU, where n is greater than or equal to one and is smaller than or equal to M.

Further, the executing the foregoing steps N times for an $n^{th}$ operating CPU may include when a timing moment of a timer n corresponding to the $n^{th}$ operating CPU arrives, executing first four functions of the processor 5011. Therefore, when the timing moment of the timer n arrives N times consecutively, the first four functions of the processor 5011 are executed N times in total.

In addition, the method in this embodiment may further include when a system is idle, stopping, by the timer n, timing.

In addition, the method in this embodiment may further include when the system is not idle, starting, by the timer n, timing. Whether the system is idle is notified by an operating system of a device where a scheduling CPU that executes the method in this embodiment is located to the CPU responsible for scheduling.

In addition, the method in this embodiment may further include: if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, stopping, by the timer, timing.

The maximum frequency lasting period time threshold is (the CPU turn-on power consumption sensitive factor threshold×N)/(a usage rate threshold×a frequency weight), where the frequency weight is the first weight, that is, the high weight, the value of which may be 4. The usage rate threshold may be a different value according to a different platform; preferably, a value range of this value may be between 90% and 95%. The different platform here refers to a different hardware chipset.

That the number of times that the operating frequencies are all maximum frequency values is just greater than a maximum frequency lasting period time threshold is the number of times that the operating frequencies are all maximum frequency values is the maximum frequency lasting period time threshold plus one.

Further, that the processor 5011 turns on at least one CPU in a non-operating state when the mean is greater than a CPU turn-on power consumption sensitive factor threshold may include: if the mean is greater than the CPU turn-on power consumption sensitive factor threshold, and the number of queue tasks running on the operating CPUs is greater than M, turning on at least one CPU in a non-operating state.

In this embodiment, a timer is adopted to control a moment of executing a method step, and a timer is turned on or turned off based on whether a system is idle. Therefore, when a system is idle, a timer may be turned off in time, so as to save power consumption. In addition, when the system is not idle, a timer can be turned on for timing in time, so as to rapidly respond to various types of demands. In another manner, a timer is controlled to stop if when a timing moment of the timer arrives consecutively, operating frequencies of a CPU are all maximum values, and the number of times that the operating frequencies of the CPU are maximum values is just greater than a maximum frequency lasting period time threshold. This case indicates that the CPU has run at a full load for a period of time and has reached a stable state. In this case, it is unnecessary to keep the timer on, so the timer may be turned off to save electrical power. Additionally, by comparing the number of queue tasks running on a CPU and the number of operating CPUs, when the number of system tasks is greater than the number of operating CPUs, one CPU in a non-operating state is turned on, so as to rapidly respond to a user's demand and improve user experience.

A sixteenth embodiment of the present invention provides a terminal. On the basis of the twelfth embodiment, there are the following changes in this embodiment:

That the processor 5011 executes the foregoing steps N times for the one CPU may specifically include when a timing moment of a timer a corresponding to the one CPU arrives, executing first four functions of the foregoing processor 5011. Therefore, when the timing moment of the timer a arrives N times consecutively, the first four functions of the processor 5011 are executed N times in total.

In addition, the method in this embodiment may further include when a system is idle, stopping, by the timer a, timing.

In addition, the method in this embodiment may further include when the system is not idle, starting, by the timer a, timing. Whether the system is idle is notified by an operating system of a device where a scheduling CPU that executes the method in this embodiment is located to the CPU responsible for scheduling.

In addition, the method in this embodiment may further include: if when the timing moment of the timer arrives consecutively, acquired operating frequencies of the CPU corresponding to the timer are all maximum frequency values, and the number of times that the operating frequencies are all maximum frequency values is just greater than a maximum frequency lasting period time threshold, stopping, by the timer, timing.

The maximum frequency lasting period time threshold is (the CPU turn-on power consumption sensitive factor threshold×N)/(a usage rate threshold×a frequency weight), where the frequency weight is the first weight, that is, the high weight, the value of which may be 4.

That the number of times that the operating frequencies are all maximum frequency values is just greater than a maximum frequency lasting period time threshold is the number of times that the operating frequencies are all maximum frequency values is the maximum frequency lasting period time threshold plus one.

Further, that the processor 5011 turns on at least one CPU in a non-operating state when the mean is greater than a CPU turn-on power consumption sensitive factor threshold may include if the mean is greater than the CPU turn-on power consumption sensitive factor threshold, and the number of queue tasks running on the operating CPUs is greater than M, turning on at least one CPU in a non-operating state.

In this embodiment, a timer is adopted to control a moment of executing a method step, and a timer is turned on or turned off based on whether a system is idle. Therefore, when a system is idle, a timer may be turned off in time, so as to save power consumption. In addition, when the system is not idle, a timer can be turned on for timing in time, so as to rapidly respond to various types of demands. In another manner, a timer is controlled to stop if when a timing moment of the timer arrives consecutively, operating frequencies of a CPU are all maximum values, and the number of times that the operating frequencies of the CPU are maximum values is just greater than a maximum frequency lasting period time threshold. This case indicates that the CPU has run at a full load for a period of time and has reached a stable state. In this case, it is unnecessary to keep the timer on, so the timer may be turned off to save electrical power. Additionally, by comparing the number of queue tasks running on a CPU and the number of operating CPUs, when the number of system tasks is greater than the number of operating CPUs, one CPU in a non-operating state is turned on, so as to rapidly respond to a user's demand and improve user experience.

The terminal in the ninth to the twelfth embodiments may include various types of terminals, including a fixed terminal, a mobile terminal, and the like. A type of the terminal is not limited here, and as long as a terminal is not a central office end device, the terminal may be regarded as the terminal here. For example, the terminal may further include a mobile phone, a tablet computer, a personal digital assistant (PDA), a point of sales (POS), an on-board computer, and the like.

Figure 6:
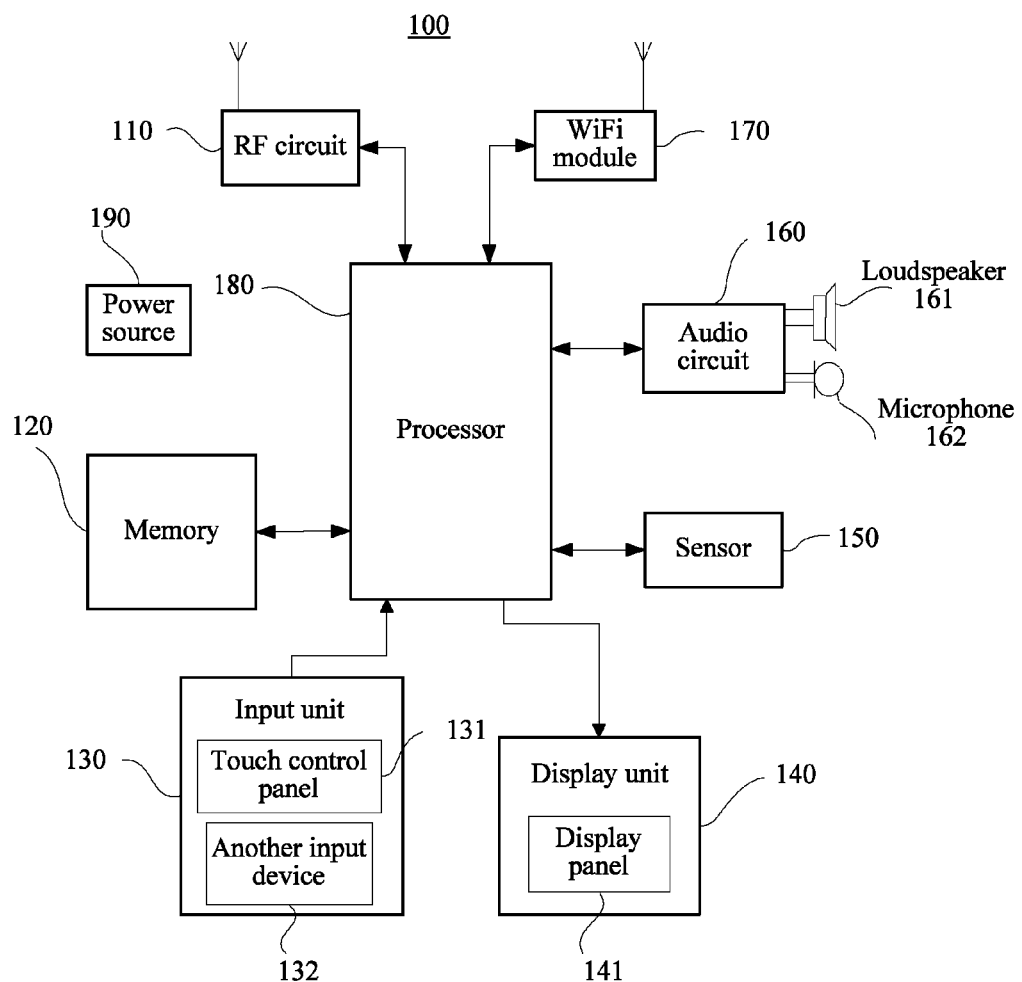
FIG. 6 is a block diagram of a partial structure of a mobile phone according to a seventeenth embodiment of the present invention.

A seventeenth embodiment of the present invention provides a mobile phone. The mobile phone may be a specific form of the terminal provided in the ninth to the twelfth embodiments of the present invention. FIG. 6 is a block diagram of a partial structure of the mobile phone. Referring to FIG. 6, a mobile phone 100 includes components such as a Radio Frequency (RF) circuit 110, a memory 120, an input unit 130, a display unit 140, a sensor 150, an audio circuit 160, a wireless fidelity (WiFi) module 170, a processor 180, and a power source 190. A person skilled in the art may understand that the structure of the mobile phone in FIG. 6 does not limit the mobile phone, and more or fewer components than those shown may be included, or some components may be combined, or different component arrangement may be adopted.

In the following, each component of the mobile phone 100 is introduced in detail with reference to FIG. 6.

The RF circuit 110 may be configured to receive and send information or receive and send signals in a call process, in particular, receive downlink information of a base station and send the downlink information to the processor 180 for processing; and in addition, send the base station data designed to be uplink. Usually, the RF circuit 110 includes, but is not limited to, an antenna, at least one amplifier, a transceiver, a coupler, a Low Noise Amplifier (LNA), a duplexer, and the like. In addition, the RF circuit 110 may further communicate with a network and another device through wireless communication. The wireless communication may adopt any communication standard or protocol, which includes, but is not limited to, Global System of Mobile communication (GSM), General Packet Radio Service (GPRS), Code Division Multiple Access (CDMA), Wideband CDMA (WCDMA), Long Term Evolution (LTE), e-mail, and Short Messaging Service (SMS), and the like.

The memory 120 may be configured to store a software program and a module. The processor 180 executes all functional applications and data processing of the mobile phone 100 by running the software program and the module that are stored in the memory 120. The memory 120 may mainly include a program storage area and a data storage area. The program storage area may store an operating system, an application program required for at least one function (for example, a sound playing function, an image playing function), and the like. The data storage area may store data created according to use of the mobile phone 100 (for example, audio data, and contacts), and the like. In addition, the memory 120 may include a high speed random access memory, and may further include a nonvolatile memory, for example, at least one disk storage device, at least one flash storage device, or other volatile solid state storage devices.

The input unit 130 may be configured to receive input number or character information and generate key signal inputs related to user settings and function control of the mobile phone 100. Specifically, the input unit 130 may include a touch control panel 131 and another input device 132. The touch control panel 131 is also referred to as a touchscreen, may collect a user's touch operation on or near the touch control panel 131 (for example, a user's operation on the touch control panel 131 or near the touch control panel 131 with any suitable object or accessory such as a finger and a stylus) and drive a corresponding connecting apparatus according to a preset program. Optionally, the touch control panel 131 may include two parts, a touch detecting apparatus and a touch controller. The touch detecting apparatus detects a position of a user's touch and detects a signal produced by a touch operation, and transfers the signal to the touch controller. The touch controller receives touch information from the touch detecting apparatus, converts the touch information into touch-point coordinates, and then sends the touch-point coordinates to the processor 180, and can receive a command sent from the processor 180 and execute the command. In addition, the touch control panel 131 may be implemented by adopting resistive, capacitive, infrared, surface sound wave types, and the like. In addition to the touch control panel 131, the input unit 130 may further include the other input device 132. Specifically, the another input device 132 may include, but is not limited to, one or more of a physical keyboard, a function button (such as a volume control button, and a switch button), a trackball, a mouse, and a joystick.

The display unit 140 may be configured to display information input by a user or information provided for a user and all menus of the mobile phone 100. The display unit 140 may include a display panel 141, and optionally, the display panel 141 may be configured in a form of a Liquid Crystal Display (LCD), an Organic Light-Emitting Diode (OLED). Further, the touch control panel 131 may cover the display panel 141. After detecting a touch operation on or near the touch control panel 131, the touch control panel 131 transfers the touch operation to the processor 180 to determine a type of a touch event. Then, the processor 180 provides a corresponding visual output on the display panel 141 according to the type of the touch event. Although in FIG. 6, the touch control panel 131 and the display panel 141 serve as two independent components to implement input and input functions of the mobile phone 100, in some embodiments, the touch control panel 131 and the display panel 141 may be integrated to implement the input and output functions of the mobile phone 100.

The mobile phone 100 may further include at least one sensor 150, for example, a light sensor, a motion sensor and other sensors. Specifically, the light sensor may include an ambient light sensor and a proximity sensor. The ambient light sensor may adjust brightness of the display panel 141 according to an intensity of ambient light rays. The proximity sensor may turn off the display panel 141 and/or backlight when the mobile phone 100 moves near an ear. As one type of motion sensor, an accelerator sensor may detect acceleration in each direction (generally three axes) and may detect magnitude and a direction of gravity when staying still, which may be used for applications for recognizing postures of a mobile phone (for example, landscape and portrait switching, relevant games, magnetometer posture calibration), vibration recognition relevant functions (for example, pedometers and strikes), and the like. Other sensors such as a gyroscope, a barometer, a hygrometer, a thermometer, and an infrared sensor may also be configured on the mobile phone 100, which are not described in detail here.

The audio circuit 160, a loudspeaker 161, and a microphone 162 may provide an audio interface between a user and the mobile phone 100. The audio circuit 160 may convert received audio data into an electrical signal, and transmit the electrical signal to the loudspeaker 161, and the loudspeaker 161 converts the electrical signal into an audio signal for output. In another aspect, the microphone 162 converts a collected audio signal into an electrical signal. The audio circuit 160 receives the electrical signal, converts the electrical signal into audio data, and then outputs the audio data to the RF circuit 110, so as to send the audio data to, for example, another mobile phone, or outputs the audio data to the memory 120 for further processing.

WiFi is a short distance wireless transmission technology. The mobile phone 100 may help, through the WiFi module 170, a user receive and send an e-mail, browse a webpage, access stream media, and the like. The WiFi module 170 provides wireless broadband Internet access for a user. Although the WiFi module 170 is shown in FIG. 1, it may be understood that, the WiFi module 170 is not an essential component of the mobile phone 100, and may completely be omitted according to demands without changing the scope of the essence of the present invention.

The processor 180 is a control center of the mobile phone 100 and is connected to all parts of the entire mobile phone through various types of interfaces and wires. By running or executing the software program and/or the module stored in the memory 120 and invoking data stored in the memory 120, the processor 180 executes all functions and data processing of the mobile phone 100, so as to monitor the mobile phone on the whole. Optionally, the processor 180 may integrate an application processor and a modem processor. The application processor mainly processes an operating system, a user interface, an application program, and the like. The modem processor mainly processes wireless communication. It may be understood that the foregoing modem processor may also not be integrated in the processor 180.

Optionally, the processor 180 may include one or more processing units. One or more processing units may include one independent scheduling CPU and one or more ordinary CPUs. The scheduling CPU may schedule an ordinary CPU. A hardware form of the scheduling CPU may be an ARM chip, and may also be other chips such as a single-chip microcomputer. The ordinary CPU is an ordinary CPU that executes instructions and computation. It may be understood that a function of the scheduling CPU may also be integrated in one or more ordinary CPUs, which is not limited in this embodiment. For the function of the scheduling CPU, reference may be specifically made to the ninth to twelfth embodiments, and details are not repeatedly described here.

The mobile phone 100 further includes the power source 190 (for example, a battery) for supplying power to each component. Preferably, the power source may be logically connected to the processor 180 through a power source management system, so as to implement functions such as managing charging, discharging, and power consumption through the power source management system.

Though not shown, the mobile phone 100 may further include a camera, a Bluetooth module, and the like, which are not described in detail here.

Figure 7:
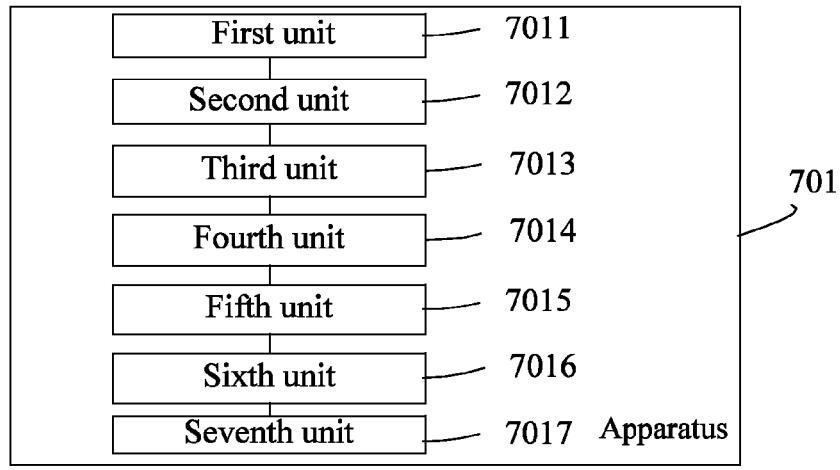
FIG. 7 is a schematic diagram of a general structure of an apparatus according to an eighteenth embodiment of the present invention.

An eighteenth embodiment of the present invention further provides an apparatus. FIG. 7 is a schematic diagram of a general structure of the apparatus. The apparatus 701 includes the following units:

A first unit 7011 is configured to acquire a usage rate and an operating frequency of one CPU of operating CPUs, where the number of the operating CPUs is M, and M is a positive integer greater than or equal to two.

A second unit 7012 is configured to determine whether the operating frequency of the one CPU is smaller than a core off-line frequency.

A third unit 7013 is configured to, when the operating frequency of the one CPU is smaller than the core off-line frequency, multiply the usage rate of the one CPU by a first weight to obtain a CPU power consumption sensitive factor corresponding to the one CPU.

A fourth unit 7014 is configured to, when the operating frequency of the one CPU is greater than or equal to the core off-line frequency, multiply the usage rate of the one CPU by a second weight to obtain a CPU power consumption sensitive factor corresponding to the one CPU, where the first weight and the second weight are not equal and are both positive integers greater than or equal to one.

A fifth unit 7015 is configured to execute the foregoing steps N times for each of M operating CPUs, where N is a positive integer greater than or equal to one; and acquire M×N CPU power consumption sensitive factors after the foregoing steps are executed N times.

A sixth unit 7016 is configured to acquire a mean of the M×N CPU power consumption sensitive factors.

A seventh unit 7017 is configured to turn off at least one operating CPU when the mean is smaller than a CPU turn-off power consumption sensitive factor threshold.

In the apparatus provided in the eighteenth embodiment of the present invention, a concept of a first weight and a second weight is introduced. A usage rate of a CPU is multiplied to obtain a CPU power consumption sensitive factor, and a mean of CPU power consumption sensitive factors is calculated, and is compared with a CPU power consumption sensitive factor threshold. At least one operating CPU is turned off if the mean is smaller than a CPU turn-off power consumption sensitive factor threshold. By using weights and a mean, it is ensured that a stable condition is provided for turning off a CPU, thereby saving electrical energy consumption of a CPU.

A nineteenth embodiment of the present invention further provides an apparatus. FIG. 7 is a schematic diagram of a general structure of the apparatus. The apparatus 701 includes the following units:

A first unit 7011 is configured to acquire a usage rate and an operating frequency of one CPU of operating CPUs, where the number of the operating CPUs is M, and M is a positive integer greater than or equal to two.

A second unit 7012 is configured to determine whether the operating frequency of the one CPU is smaller than a core off-line frequency.

A third unit 7013 is configured to, when the operating frequency of the one CPU is smaller than the core off-line frequency, multiply the usage rate of the one CPU by a first weight to obtain a CPU power consumption sensitive factor corresponding to the one CPU.

A fourth unit 7014 is configured to, when the operating frequency of the one CPU is greater than or equal to the core off-line frequency, multiply the usage rate of the one CPU by a second weight to obtain a CPU power consumption sensitive factor corresponding to the one CPU, where the first weight and the second weight are not equal and are both positive integers greater than or equal to one.

A fifth unit 7015 is configured to execute the foregoing steps N times for the one CPU, where N is a positive integer greater than or equal to one, and acquire N CPU power consumption sensitive factors after the foregoing steps are executed N times.

A sixth unit 7016 is configured to acquire a mean of the N CPU power consumption sensitive factors.

A seventh unit 7017 is configured to turn off at least one operating CPU when the mean is smaller than a CPU turn-off power consumption sensitive factor threshold.

The apparatus provided in the nineteenth embodiment of the present invention is different from the eighteenth embodiment in that CPU power consumption sensitive factors of N times are calculated only through one CPU, and a mean of the CPU power consumption sensitive factors of N times is calculated, and is compared with a CPU turn-off power consumption sensitive factor threshold, so as to determine that at least one operating CPU is in a non-operating state. Compared with the apparatus in the eighteenth embodiment, implementation of the nineteenth embodiment requires fewer CPUs, and therefore, an entire algorithm is simpler and more effective.

A twentieth embodiment of the present invention further provides an apparatus. FIG. 7 is a schematic diagram of a general structure of the apparatus. The apparatus 701 includes the following units:

A first unit 7011 is configured to acquire a usage rate and an operating frequency of one CPU of operating CPUs, where the number of the operating CPUs is M, M is a positive integer greater than or equal to one, and the number of CPUs in a non-operating state is greater than or equal to one.

A second unit 7012 is configured to determine whether the operating frequency of the one CPU is greater than a core on-line frequency.

A third unit 7013 is configured to, when the operating frequency of the one CPU is greater than the core on-line frequency, multiply the usage rate of the one CPU by a first weight to obtain a CPU power consumption sensitive factor corresponding to the one CPU.

A fourth unit 7014 is configured to, when the operating frequency of the one CPU is smaller than or equal to the core on-line frequency, multiply the usage rate of the one CPU by a second weight to obtain a CPU power consumption sensitive factor corresponding to the one CPU, where the first weight and the second weight are not equal and are both positive integers greater than or equal to one.

A fifth unit 7015 is configured to execute the foregoing steps for M operating CPUs, and repeat N times, where N is a positive integer greater than or equal to one; and acquire M×N CPU power consumption sensitive factors after the foregoing steps are executed N times.

A sixth unit 7016 is configured to acquire a mean of the M×N CPU power consumption sensitive factors.

A seventh unit 7017 is configured to turn on at least one CPU in a non-operating state when the mean is greater than a CPU turn-on power consumption sensitive factor threshold.

In the apparatus provided in the twentieth embodiment of the present invention, a concept of a first weight and a second weight is introduced. A usage rate of a CPU is multiplied to obtain a CPU power consumption sensitive factor, and a mean of CPU power consumption sensitive factors is calculated, and is compared with a CPU power consumption sensitive factor threshold. At least one CPU in a non-operating state is turned on if the mean is greater than a CPU turn-on power consumption sensitive factor threshold. By using weights and a mean, it is ensured that a stable condition is provided for turning on a CPU, thereby saving electrical energy consumption of a CPU.

A twenty-first embodiment of the present invention further provides an apparatus. FIG. 7 is a schematic diagram of a general structure of the apparatus. The apparatus 701 includes the following units:

A first unit 7011 is configured to acquire a usage rate and an operating frequency of one CPU of operating CPUs, where the number of the operating CPUs is M, M is a positive integer greater than or equal to one, and the number of CPUs in a non-operating state is greater than or equal to one.

A second unit 7012 is configured to determine whether the operating frequency of the one CPU is greater than a core on-line frequency.

A third unit 7013 is configured to, when the operating frequency of the one CPU is greater than the core on-line frequency, multiply the usage rate of the one CPU by a first weight to obtain a CPU power consumption sensitive factor corresponding to the one CPU.

A fourth unit 7014 is configured to, when the operating frequency of the one CPU is smaller than or equal to the core on-line frequency, multiply the usage rate of the one CPU by a second weight to obtain a CPU power consumption sensitive factor corresponding to the one CPU, where the first weight and the second weight are not equal and are both positive integers greater than or equal to one.

A fifth unit 7015 is configured to execute the foregoing steps N times for the one CPU, where N is a positive integer greater than or equal to one; and acquire N CPU power consumption sensitive factors after the foregoing steps are executed N times.

A sixth unit 7016 is configured to acquire a mean of the N CPU power consumption sensitive factors.

A seventh unit 7017 is configured to turn on at least one CPU in a non-operating state when the mean is greater than a CPU turn-on power consumption sensitive factor threshold.

The apparatus provided in the twenty-first embodiment of the present invention is different from the twentieth embodiment in that CPU power consumption sensitive factors of N times are calculated only through one CPU, and a mean of the CPU power consumption sensitive factors of N times is calculated, and is compared with a CPU turn-on power consumption sensitive factor threshold, so as to determine that at least one CPU that is currently in a non-operating state is in an operating state. Compared with the apparatus in the twenty-first embodiment, implementation of the twentieth embodiment requires fewer CPUs, and therefore, an entire algorithm is simpler and more effective.

Figure 8:
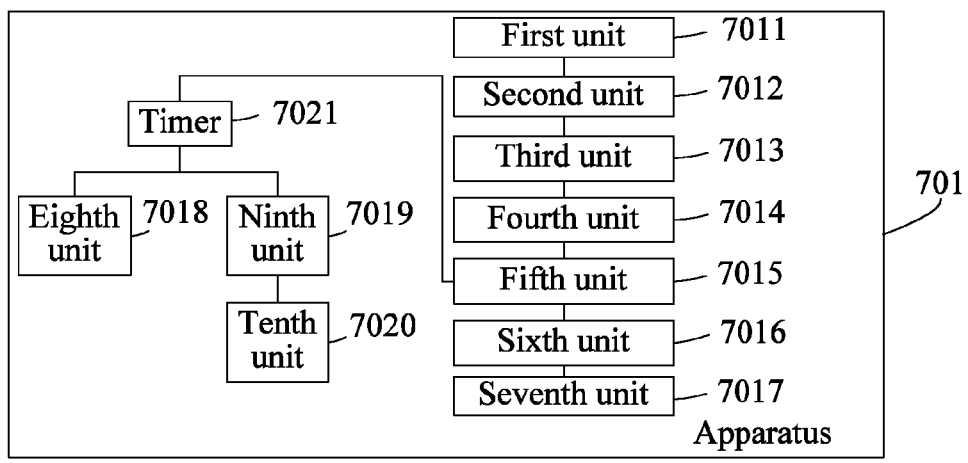
FIG. 8 is a schematic diagram of a detailed structure of an apparatus according to a twelfth embodiment of the present invention.

A twenty-second embodiment of the present invention further provides an apparatus. FIG. 8 is a schematic diagram of a detailed structure of the apparatus. On the basis of the eighteenth embodiment, there are the following changes:

That the fifth unit 7015 executes the foregoing steps N times for each of M operating CPUs may specifically include executing the foregoing steps N times for an $n^{th}$ operating CPU, where n is greater than or equal to one and is smaller than or equal to M.

Further, a timer n corresponding to the $n^{th}$ operating CPU is further included, so that the executing the foregoing steps N times for an $n^{th}$ operating CPU may include when a timing moment of the timer n corresponding to the $n^{th}$ operating CPU arrives, executing functions of the first unit to the fourth unit. Therefore, when the timing moment of the timer n arrives N times consecutively, the functions from the first unit to the fourth unit are executed N times in total.

In addition, the apparatus in this embodiment may further include an eighth unit 7018 configured to: when a system is idle, control the timer n corresponding to the $n^{th}$ operating CPU to stop timing.

In addition, the apparatus in this embodiment may further include a ninth unit 7019 configured to: when the system is not idle, control the timer n to start timing. Whether the system is idle is notified by an operating system of a device where a scheduling CPU that executes the embodiment is located to the CPU responsible for scheduling.

Further, that the seventh unit 7017 turns off at least one operating CPU when the mean is smaller than a CPU turn-off power consumption sensitive factor threshold may specifically include if the mean is smaller than the CPU turn-off power consumption sensitive factor threshold, and the number of queue tasks running on the operating CPUs is smaller than M, turning off at least one operating CPU. A queue task running on a CPU is a running thread.

In this embodiment, a timer 7021 is adopted to control a moment of executing a method step, and a timer 7021 is turned on or turned off based on whether a system is idle. Therefore, when a system is idle, a timer 7021 may be turned off in time, so as to save power consumption. In addition, when the system is not idle, a timer 7021 can be turned on for timing in time, so as to rapidly respond to various types of demands. Additionally, by comparing the number of queue tasks running on a CPU and the number of operating CPUs, when a system load is unbalanced, the power consumption may still be saved. For example, when there is only one task that cannot be separated to run on two or more CPUs running in a system (for example, one thread task, or one single-thread process task), and a system load occupied by the task is higher than a system load busy threshold, the number of running CPU cores is not increased. In this way, occurrence of the following case is avoided: The number of CPU cores is increased individually, but because the system is running on a single process in this case, scheduling on different CPUs cannot be performed at the same time, which results in an ineffective power consumption overhead of a newly added CPU.

A twenty-third embodiment of the present invention further provides an apparatus. FIG. 8 is a schematic diagram of a detailed structure of the apparatus. On the basis of the nineteenth embodiment, there are the following changes:

The apparatus further includes a timer a corresponding to one CPU.

That the fifth unit 7015 executes the foregoing steps N times for the one CPU may specifically include when a timing moment of the timer a corresponding to the one CPU arrives, executing functions of the first unit 7011 to the fourth unit 7014. Therefore, when the timing moment of the timer a arrives N times consecutively, the functions of the first unit to the fourth unit 7014 are executed N times in total.

In addition, the apparatus may further include an eighth unit 7018 configured to: when a system is idle, control the timer a to stop timing.

In addition, the apparatus may further include a ninth unit 7019 configured to: when the system is not idle, control the timer a to start timing. Whether the system is idle is notified by an operating system of a device where a scheduling CPU that executes the embodiment is located to the CPU responsible for scheduling.

Further, that the seventh unit 7017 turns off at least one operating CPU when the mean is smaller than a CPU turn-off power consumption sensitive factor threshold may specifically include if the mean is smaller than the CPU turn-off power consumption sensitive factor threshold, and the number of queue tasks running on the operating CPUs is smaller than M, turning off at least one operating CPU.

In this embodiment, a timer 7021 is adopted to control a moment of executing a method step, and a timer 7021 is turned on or turned off based on whether a system is idle. Therefore, when a system is idle, a timer 7021 may be turned off in time, so as to save power consumption. In addition, when the system is not idle, a timer 7021 can be turned on for timing in time, so as to rapidly respond to various types of demands. Additionally, by comparing the number of queue tasks running on a CPU and the number of operating CPUs, when a system load is unbalanced, the power consumption may still be saved. For example, when there is only one task that cannot be separated to run on two or more CPUs running in a system (for example, one thread task, or one single-thread process task), and a system load occupied by the task is higher than a system load busy threshold, the number of running CPU cores is not increased. In this way, occurrence of the following case is avoided: The number of CPU cores is increased individually, but because the system is running on a single process in this case, scheduling on different CPUs cannot be performed at the same time, which results in an ineffective power consumption overhead of a newly added CPU.

A twenty-fourth embodiment of the present invention further provides an apparatus. FIG. 8 is a schematic diagram of a detailed structure of the apparatus. On the basis of the twentieth embodiment, there are the following changes:

That the fifth unit 7015 executes the foregoing steps N times for each of M operating CPUs may specifically include executing the foregoing steps N times for an $n^{th}$ operating CPU, where n is greater than or equal to one and is smaller than or equal to M.

Further, a timer n corresponding to the $n^{th}$ operating CPU is further included, so that the executing the foregoing steps N times for an $n^{th}$ operating CPU may include when a timing moment of the timer n corresponding to the $n^{th}$ operating CPU arrives, executing the foregoing steps 301 to 304. Therefore, when the timing moment of the timer n arrives N times consecutively, the foregoing steps 301 to 304 are executed N times in total.

In addition, the apparatus in this embodiment may further include an eighth unit 7018 configured to: when a system is idle, control the timer n to stop timing.

In addition, the apparatus in this embodiment may further include a ninth unit 7019 configured to: when the system is not idle, control the timer n to start timing. Whether the system is idle is notified by an operating system of a device where a scheduling CPU that executes the embodiment is located to the CPU responsible for scheduling.

In addition, the apparatus in this embodiment may further include a tenth unit 7020 configured to: if when the timing moment of the timer 7021 arrives consecutively, acquired operating frequencies of the CPU corresponding to the timer 7021 are all maximum frequency values, and the number of times that the operating frequencies are all maximum frequency values is just greater than a maximum frequency lasting period time threshold, control the timer to stop timing.

The maximum frequency lasting period time threshold is (the CPU turn-on power consumption sensitive factor threshold×N)/(a usage rate threshold×a frequency weight), where the frequency weight is the first weight, that is, a high weight, a value of which may be 4. The usage rate threshold may be a different value according to a different platform. Preferably, a value range of this value may be between 90% and 95%. The different platform here refers to a different hardware chipset.

That the number of times that the operating frequencies are all maximum frequency values is just greater than a maximum frequency lasting period time threshold is the number of times that the operating frequencies are all maximum frequency values is the maximum frequency lasting period time threshold plus one.

Further, that the seventh unit 7017 turns on at least one CPU in a non-operating state when the mean is greater than a CPU turn-on power consumption sensitive factor threshold may include: if the mean is greater than the CPU turn-on power consumption sensitive factor threshold, and the number of queue tasks running on the operating CPUs is greater than M, turning on at least one CPU in a non-operating state.

In this embodiment, a timer 7021 is adopted to control a moment of executing a method step, and a timer 7021 is turned on or turned off based on whether a system is idle. Therefore, when a system is idle, a timer 7021 may be turned off in time, so as to save power consumption. In addition, when the system is not idle, a timer 7021 can be turned on for timing in time, so as to rapidly respond to various types of demands. In another manner, a timer 7021 is controlled to stop if when a timing moment of the timer 7021 arrives consecutively, operating frequencies of a CPU are all maximum values, and the number of times that the operating frequencies of the CPU are maximum values is just greater than a maximum frequency lasting period time threshold. This case indicates that the CPU has run at a full load for a period of time and has reached a stable state. In this case, it is unnecessary to keep the timer on, so the timer may be turned off to save electrical power. Additionally, by comparing the number of queue tasks running on a CPU and the number of operating CPUs, when the number of system tasks is greater than the number of operating CPUs, one CPU in a non-operating state is turned on, so as to rapidly respond to a user's demand and improve user experience.

A twenty-fifth embodiment of the present invention further provides an apparatus. FIG. 8 is a schematic diagram of a detailed structure of the apparatus. On the basis of the twenty-first embodiment, there are the following changes:

The apparatus further includes a timer a corresponding to one CPU.

That the fifth unit 7015 executes the foregoing steps N times for the one CPU may specifically include when a timing moment of the timer a corresponding to the one CPU arrives, executing functions of the foregoing first unit to fourth unit 7014. Therefore, when the timing moment of the timer a arrives N times consecutively, the functions of the first unit 7011 to the fourth unit 7014 are executed N times in total.

In addition, the embodiment may further include an eighth unit 7018 configured to: when a system is idle, control the timer a to stop timing.

In addition, the embodiment may further include a ninth unit 7019 configured to: when the system is not idle, control the timer a to start timing. Whether the system is idle is notified by an operating system of a device where a scheduling CPU that executes the embodiment is located to the CPU responsible for scheduling.

In addition, the apparatus in this embodiment may further include a tenth unit 7020 configured to: if when the timing moment of the timer 7021 arrives consecutively, acquired operating frequencies of the CPU corresponding to the timer 7021 are all maximum frequency values, and the number of times that the operating frequencies are all maximum frequency values is just greater than a maximum frequency lasting period time threshold, control the timer to stop timing.

The maximum frequency lasting period time threshold is (the CPU turn-on power consumption sensitive factor threshold×N)/(a usage rate threshold×a frequency weight), where the frequency weight is the first weight, that is, a high weight, a value of which may be 4.

That the number of times that the operating frequencies are all maximum frequency values is just greater than a maximum frequency lasting period time threshold is the number of times that the operating frequencies are all maximum frequency values is the maximum frequency lasting period time threshold plus one.

Further, that the seventh unit 7017 turns on at least one CPU in a non-operating state when the mean is greater than a CPU turn-on power consumption sensitive factor threshold may include if the mean is greater than the CPU turn-on power consumption sensitive factor threshold, and the number of queue tasks running on the operating CPUs is greater than M, turning on at least one CPU in a non-operating state.

In this embodiment, a timer 7021 is adopted to control a moment of executing a method step, and a timer 7021 is turned on or turned off based on whether a system is idle. Therefore, when a system is idle, a timer 7021 may be turned off in time, so as to save power consumption. In addition, when the system is not idle, a timer 7021 can be turned on for timing in time, so as to rapidly respond to various types of demands. In another manner, a timer 7021 is controlled to stop if when a timing moment of the timer 7021 arrives consecutively, operating frequencies of a CPU are all maximum values, and the number of times that the operating frequencies of the CPU are maximum values is just greater than a maximum frequency lasting period time threshold. This case indicates that the CPU has run at a full load for a period of time and has reached a stable state. In this case, it is unnecessary to keep the timer 7021 on, so the timer 7021 may be turned off to save electrical power. Additionally, by comparing the number of queue tasks running on a CPU and the number of operating CPUs, when the number of system tasks is greater than the number of operating CPUs, one CPU in a non-operating state is turned on, so as to rapidly respond to a user's demand and improve user experience.

A twenty-sixth embodiment of the present invention further provides a computer program carrying program codes. When the computer program is run on a computer, the program codes execute the method in any one of the first to the eighth embodiments.

A twenty-seventh embodiment of the present invention further provides a computer readable storage medium. The computer readable storage medium stores computer program codes. When the computer program codes are executed by a computer, the computer program codes may enable the computer to execute the method in any one of the first to the eighth embodiments.

A twenty-eighth embodiment of the present invention further provides a computer program product. The computer program product includes computer program codes. When the computer program codes are executed by a computer, the computer program codes may enable the computer to execute the method in any one of the first to the eighth embodiments.

Apparently, a person skilled in the art may make various modifications and variations to the present invention without departing from the spirit and scope of the present invention. In this case, if these modifications and variations of the present invention fall within the scope of the claims of the present invention and equivalent technologies of the claims of the present invention, the present invention is intended to cover these modifications and variations.

What is claimed is:

1. A method for controlling a central processing unit (CPU), comprising:
    acquiring a usage rate and an operating frequency of one CPU of a plurality of operating CPUs, wherein the number of the operating CPUs is M, and wherein M is a positive integer greater than or equal to two;
    determining whether the operating frequency of the one CPU is smaller than a core off-line frequency;
    multiplying the usage rate of the one CPU by a first weight to obtain a CPU power consumption sensitive factor corresponding to the one CPU when the operating frequency of the one CPU is smaller than the core off-line frequency;
    multiplying the usage rate of the one CPU by a second weight to obtain a CPU power consumption sensitive factor corresponding to the one CPU when the operating frequency of the one CPU is greater than or equal to the core off-line frequency, wherein the first weight and the second weight are not equal and are both positive integers greater than or equal to one;
    executing the foregoing steps N times for each of M operating CPUs, wherein N is a positive integer greater than or equal to one;
    acquiring M×N CPU power consumption sensitive factors after the foregoing steps are executed N times;
    acquiring a mean of the M×N CPU power consumption sensitive factors; and
    turning off at least one operating CPU when the mean is smaller than a CPU turn-off power consumption sensitive factor threshold.

2. The method according to claim 1, wherein executing the foregoing steps N times for each of M operating CPUs comprises executing the foregoing steps N times for an $n^{th}$ operating CPU, wherein n is greater than or equal to one and is smaller than or equal to M, and wherein the second weight is greater than or equal to two.

3. The method according to claim 2, wherein executing the foregoing steps N times for an $n^{th}$ operating CPU comprises when a timing moment of $n^{th}$ timer corresponding to the $n^{th}$ operating CPU arrives, executing the foregoing steps, so that when the timing moment of the $n^{th}$ timer arrives N times consecutively, the foregoing steps are executed N times.

4. The method according to claim 3, further comprising:
    stopping, by the timer, timing when a system is idle; and
    starting, by the timer, timing when the system is not idle.

5. The method according to claim 1, wherein turning off the at least one operating CPU when the mean is smaller than the CPU turn-off power consumption sensitive factor threshold comprises turning off at least one operating CPU when the mean is smaller than the CPU turn-off power consumption sensitive factor threshold and the number of queue tasks running on the operating CPUs is smaller than M.

6. A method for controlling a central processing unit (CPU), comprising:
    acquiring a usage rate and an operating frequency of one CPU of operating CPUs, wherein the number of the operating CPUs is M, M is a positive integer greater than or equal to one, and the number of CPUs in a non-operating state is greater than or equal to one;

determining whether the operating frequency of the one CPU is greater than a core on-line frequency;

multiplying the usage rate of the one CPU by a first weight to obtain a CPU power consumption sensitive factor corresponding to the one CPU when the operating frequency of the one CPU is greater than the core on-line frequency;

multiplying the usage rate of the one CPU by a second weight to obtain the CPU power consumption sensitive factor corresponding to the one CPU when the operating frequency of the one CPU is smaller than or equal to the core on-line frequency, wherein the first weight and the second weight are not equal and are both positive integers greater than or equal to one;

executing the foregoing steps for M operating CPUs, and repeating N times, wherein N is a positive integer greater than or equal to one;

acquiring M×N CPU power consumption sensitive factors after the foregoing steps are executed N times;

acquiring a mean of the M×N CPU power consumption sensitive factors; and turning on at least one CPU in the non-operating state when the mean is greater than a CPU turn-on power consumption sensitive factor threshold.

7. The method according to claim 6, wherein executing the foregoing steps N times for each of M operating CPUs comprises executing the foregoing steps N times for an $n^{th}$ operating CPU, and wherein n is greater than or equal to one and is smaller than or equal to M.

8. The method according to claim 7, wherein executing the foregoing steps N times for an $n^{th}$ operating CPU comprises when a timing moment of $n^{th}$ timer corresponding to the $n^{th}$ operating CPU arrives, executing the foregoing steps so that when the timing moment of the $n^{th}$ timer arrives N times consecutively, the foregoing steps are executed N times.

9. The method according to claim 8, further comprising:
stopping, by the timer, timing when a system is idle; and
starting, by the timer, timing when the system is not idle.

10. The method according to claim 8, further comprising stopping, by the timer, timing when the timing moment of the timer arrives consecutively, the acquired operating frequencies of the CPU corresponding to the timer are all maximum frequency values, and the number of times that the operating frequencies are all maximum frequency values is greater than a maximum frequency lasting period time threshold.

11. The method according to claim 10, wherein the maximum frequency lasting period time threshold is (the CPU turn-on power consumption sensitive factor threshold× N)/(a usage rate threshold×a frequency weight), wherein a frequency weight is the first weight, wherein the number of times that the operating frequencies are all maximum frequency values is equal to the maximum frequency lasting period time threshold plus one.

12. The method according to claim 6, wherein turning on at least one CPU in the non-operating state when the mean is greater than a CPU turn-on power consumption sensitive factor threshold comprises turning on at least one CPU in the non-operating state when the mean is greater than the CPU turn-on power consumption sensitive factor threshold and the number of queue tasks running on the operating CPUs is greater than M.

13. A terminal, comprising a processor, wherein the processor is programmed to:
acquire a usage rate and an operating frequency of one central processing unit (CPU) of operating CPUs, wherein the number of the operating CPUs is M, and wherein M is a positive integer greater than or equal to two;

determine whether the operating frequency of the one CPU is smaller than a core off-line frequency;

multiply the usage rate of the one CPU by a first weight to obtain a CPU power consumption sensitive factor corresponding to the one CPU when the operating frequency of the one CPU is smaller than the core off-line frequency;

multiply the usage rate of the one CPU by a second weight to obtain a CPU power consumption sensitive factor corresponding to the one CPU when the operating frequency of the one CPU is greater than or equal to the core off-line frequency, wherein the first weight and the second weight are not equal and are both positive integers greater than or equal to one;

execute the foregoing steps N times for each of M operating CPUs, wherein N is a positive integer greater than or equal to one;

acquire M×N CPU power consumption sensitive factors after the foregoing steps are executed N times;

acquire a mean of the M×N CPU power consumption sensitive factors; and turn off at least one operating CPU when the mean is smaller than a CPU turn-off power consumption sensitive factor threshold.

14. The terminal according to claim 13, wherein executing the foregoing steps N times for each of M operating CPUs comprises executing the foregoing steps N times for an $n^{th}$ operating CPU, and wherein n is greater than or equal to one and is smaller than or equal to M.

15. The terminal according to claim 13, wherein executing the foregoing steps N times for an $n^{th}$ operating CPU comprises when a timing moment of $n^{th}$ timer corresponding to the $n^{th}$ operating CPU arrives, executing the foregoing steps so that when the timing moment of the $n^{th}$ timer arrives N times consecutively, the foregoing steps are executed N times.

16. The terminal according to claim 15, wherein the processor is further programmed to:
control a timer to stop timing when a system is idle; and
control the timer to start timing when the system is not idle, and
wherein the second weight is greater than or equal to two.

17. The terminal according to claim 13, wherein turning off the at least one operating CPU when the mean is smaller than the CPU turn-off power consumption sensitive factor threshold comprises turning off at least one operating CPU when the mean is smaller than the CPU turn-off power consumption sensitive factor threshold and the number of queue tasks running on the operating CPUs is smaller than M.

18. A terminal, comprising a processor, wherein the processor is programmed to:
acquire a usage rate and an operating frequency of one central processing unit (CPU) of a plurality of operating CPUs, wherein the number of the operating CPUs is M, wherein M is a positive integer greater than or equal to one, and the number of CPUs in a non-operating state is greater than or equal to one;

determine whether the operating frequency of the one CPU is greater than a core on-line frequency;

multiply the usage rate of the one CPU by a first weight to obtain a CPU power consumption sensitive factor corresponding to the one CPU when the operating frequency of the one CPU is greater than the core on-line frequency;

multiply the usage rate of the one CPU by a second weight to obtain a CPU power consumption sensitive factor corresponding to the one CPU when the operating frequency of the one CPU is smaller than or equal to the core on-line frequency, wherein the first weight and the second weight are not equal and are both positive integers greater than or equal to one;

execute the foregoing steps for M operating CPUs, and repeat N times, wherein N is a positive integer greater than or equal to one;

acquire M×N CPU power consumption sensitive factors after the foregoing steps are executed N times;

acquire a mean of the M×N CPU power consumption sensitive factors; and turn on at least one CPU in a non-operating state when the mean is greater than a CPU turn-on power consumption sensitive factor threshold.

19. The terminal according to claim 18, wherein that the processor executes the foregoing steps N times for each of M operating CPUs comprises executing the foregoing steps N times for an $n^{th}$ operating CPU, and wherein n is greater than or equal to one and is smaller than or equal to M.

20. The terminal according to claim 19, wherein that the processor executes the foregoing steps N times for an $n^{th}$ operating CPU comprises when a timing moment of a $n^{th}$ timer corresponding to the n operating CPU arrives, executing the foregoing steps so that when the timing moment of the $n^{th}$ timer arrives N times consecutively, the foregoing steps are executed N times.

21. The terminal according to claim 20, wherein the processor is further programmed to:
control the timer to stop timing when a system is idle; and
control the tinier to start timing when the system is not idle.

22. The terminal according to claim 20, wherein the processor is further programmed to: control the timer to stop timing when the timing moment of the timer arrives consecutively, acquired operating frequencies of the CPU corresponding to the timer are all maximum frequency values, and the number of times that the operating frequencies are all maximum frequency values is greater than a maximum frequency lasting period time threshold.

23. The terminal according to claim 22, wherein the maximum frequency lasting period time threshold is (the CPU turn-on power consumption sensitive factor threshold× N)/(a usage rate threshold×a frequency weight), wherein a frequency weight is the first weight, and wherein the number of times that the operating frequencies are all maximum frequency values equal to the maximum frequency lasting period time threshold plus one.

24. The terminal according to claim 18, wherein turning on the at least one CPU in the non-operating state when the mean is greater than the CPU turn-on power consumption sensitive factor threshold comprises turning on at least one CPU in the non-operating state when the mean is greater than the CPU turn-on power consumption sensitive factor threshold and the number of queue tasks running on the operating CPUs is greater than M.

* * * * *

UNITED STATES PATENT AND TRADEMARK OFFICE
CERTIFICATE OF CORRECTION

| | |
|---|---|
| PATENT NO. | : 9,436,266 B2 |
| APPLICATION NO. | : 14/086711 |
| DATED | : September 6, 2016 |
| INVENTOR(S) | : Wei et al. |

It is certified that error appears in the above-identified patent and that said Letters Patent is hereby corrected as shown below:

Title Page; Attorney, Agent, or Firm - Conley Rose, P.C.; Grant Rudolph should read:

*Attorney, Agent, or Firm* - Conley Rose, P.C.; Grant Rodolph

In the Claims

Column 42; Line 45; Claim 3 should read:

The method according to claim 2, wherein executing the foregoing steps N times for an $n^{th}$ operating CPU comprises when a timing moment of a $n^{th}$ timer corresponding to the $n^{th}$ operating CPU arrives, executing the foregoing steps, so that when the timing moment of the $n^{th}$ timer arrives N times consecutively, the foregoing steps are executed N times.

Column 43; Line 50; Claim 11 should read:

The method according to claim 10, wherein the maximum frequency lasting period time threshold is (the CPU turn-on power consumption sensitive factor threshold x N) / (a usage rate threshold x a frequency weight), wherein a frequency weight is the first weight, wherein the number of times that the operating frequencies are all maximum frequency values is equal to the maximum frequency lasting period time threshold plus one.

Column 44; Line 36; Claim 15 should read:

The terminal according to claim 13, whereas executing the foregoing steps N times for an $n^{th}$ operating CPU comprises when a timing moment of a $n^{th}$ timer corresponding to the $n^{th}$ operating CPU arrives, executing the foregoing steps so that when the timing moment of the $n^{th}$ timer arrives N times consecutively, the foregoing steps are executed N times.

Signed and Sealed this
Fifteenth Day of November, 2016

Michelle K. Lee
*Director of the United States Patent and Trademark Office*

CERTIFICATE OF CORRECTION (continued)
U.S. Pat. No. 9,436,266 B2

In the Claims

Column 45; Line 28; Claim 20 should read:

The terminal according to claim 19, wherein that the processor executes the foregoing steps N times for an $n^{th}$ operating CPU comprises when a timing moment of a $n^{th}$ timer corresponding to the $n^{th}$ operating CPU arrives, executing the foregoing steps so that when the timing moment of the $n^{th}$ timer arrives N times consecutively, the foregoing steps are executed N times.

Column 46; Line 4; Claim 21 should read:

The terminal according to claim 20, wherein the processor is further programmed to:
    control the timer to stop timing when a system is idle; and
    control the timer to start timing when the system is not idle.

Column 46; Line 17; Claim 23 should read:

The terminal according to claim 22, wherein the maximum frequency lasting period time threshold is (the CPU turn-on power consumption sensitive factor threshold x N) / (a usage rate threshold x a frequency weight), wherein a frequency weight is the first weight, and wherein the number of times that the operating frequencies are all maximum frequency values is equal to the maximum frequency lasting period time threshold plus one.